US008918386B2

(12) United States Patent
Smyros et al.

(10) Patent No.: US 8,918,386 B2
(45) Date of Patent: Dec. 23, 2014

(54) SYSTEMS AND METHODS UTILIZING A SEARCH ENGINE

(76) Inventors: Athena Ann Smyros, Gunter, TX (US); Constantine John Smyros, Gunter, TX (US)

(*) Notice: Subject to any disclaimer, the term of this patent is extended or adjusted under 35 U.S.C. 154(b) by 0 days.

(21) Appl. No.: 13/402,775

(22) Filed: Feb. 22, 2012

(65) Prior Publication Data

US 2013/0054564 A1  Feb. 28, 2013

Related U.S. Application Data

(63) Continuation of application No. 12/192,775, filed on Aug. 15, 2008.

(51) Int. Cl.
*G06F 17/30* (2006.01)

(52) U.S. Cl.
CPC ................. *G06F 17/30613* (2013.01)
USPC .......................................... 707/707

(58) Field of Classification Search
CPC ..... G06F 17/10; G06F 17/274; G06F 17/301; G06F 17/30321
USPC .......................... 707/705–723, 741–745, 756
See application file for complete search history.

(56) References Cited

U.S. PATENT DOCUMENTS

| | | | |
|---|---|---|---|
| 4,849,898 A | 7/1989 | Adi | |
| 5,675,710 A * | 10/1997 | Lewis | 706/12 |
| 5,704,060 A | 12/1997 | Del Monte | |
| 6,182,029 B1 | 1/2001 | Friedman | |
| 6,278,992 B1 | 8/2001 | Curtis et al. | |
| 6,377,945 B1 | 4/2002 | Risvik | |
| 6,507,841 B2 | 1/2003 | Riverieulx de Varax | |
| 6,633,868 B1 | 10/2003 | Min et al. | |
| 6,886,010 B2 | 4/2005 | Kostoff | |
| 6,990,238 B1 | 1/2006 | Saffer et al. | |
| 7,051,017 B2 | 5/2006 | Marchisio | |
| 7,065,517 B1 | 6/2006 | Austin | |

(Continued)

FOREIGN PATENT DOCUMENTS

| | | |
|---|---|---|
| WO | WO 2010/019873 | 2/2010 |
| WO | WO 2010/019880 | 2/2010 |

(Continued)

OTHER PUBLICATIONS

International Search Report and Written Opinion issue for PCT Application No. PCT/US2009/53875, dated Dec. 7, 2009, 11 pages.

(Continued)

*Primary Examiner* — Wilson Lee
(74) *Attorney, Agent, or Firm* — Papalas PLLC

(57) ABSTRACT

Embodiments of the invention form an information set from the current set of index information available by the operations of the Pre-Search and RunTime Search components of the search engine. A search request that contains search terms and/or other search criteria (e.g. date or file type) is entered by a user through an input interface. The search terms and the information set are worked through the search engine modules to provide the actual results sought by the user. These results are provided to the user via a Return Interface. Embodiments involve a search engine that forms a numeric code index that includes grammar embedded rules from a plurality of documents, converts a search request into the same format as the index, and then compares the index and the search request to form the search results.

5 Claims, 7 Drawing Sheets

(56) References Cited

U.S. PATENT DOCUMENTS

| | | |
|---|---|---|
| 7,236,972 B2 | 6/2007 | Lewak et al. |
| 7,814,085 B1 | 10/2010 | Pfleger et al. |
| 7,882,143 B2 | 2/2011 | Smyros et al. |
| 7,899,871 B1 | 3/2011 | Kumar et al. |
| 7,996,383 B2 | 8/2011 | Smyros et al. |
| 2002/0103809 A1 | 8/2002 | Starzl et al. |
| 2003/0018604 A1 | 1/2003 | Franz et al. |
| 2003/0078766 A1 | 4/2003 | Appelt et al. |
| 2003/0101182 A1 | 5/2003 | Govrin et al. |
| 2003/0212737 A1 | 11/2003 | Moricz et al. |
| 2003/0217047 A1 | 11/2003 | Marchisio |
| 2004/0034625 A1 | 2/2004 | Reddy |
| 2004/0059736 A1 | 3/2004 | Willse et al. |
| 2004/0064438 A1 | 4/2004 | Kostoff |
| 2004/0078190 A1 | 4/2004 | Fass et al. |
| 2004/0221235 A1 | 11/2004 | Marchisio et al. |
| 2005/0021397 A1 | 1/2005 | Cui et al. |
| 2005/0021512 A1 | 1/2005 | Koenig et al. |
| 2005/0050028 A1 | 3/2005 | Rose et al. |
| 2005/0050038 A1 | 3/2005 | Kobayashi et al. |
| 2005/0108001 A1 | 5/2005 | Aarskog |
| 2005/0108200 A1 | 5/2005 | Meik et al. |
| 2005/0267871 A1 | 12/2005 | Marchisio et al. |
| 2006/0026147 A1 | 2/2006 | Cone et al. |
| 2006/0036631 A1* | 2/2006 | Cheslow ............... 707/101 |
| 2006/0059028 A1 | 3/2006 | Eder |
| 2006/0059442 A1 | 3/2006 | Bornstein et al. |
| 2006/0106783 A1 | 5/2006 | Saffer et al. |
| 2006/0184517 A1* | 8/2006 | Anderson et al. ............ 707/3 |
| 2006/0218245 A1* | 9/2006 | Horn ..................... 709/218 |
| 2006/0242564 A1 | 10/2006 | Egger et al. |
| 2006/0248066 A1 | 11/2006 | Brewer |
| 2007/0081197 A1 | 4/2007 | Omoigui |
| 2007/0083858 A1 | 4/2007 | Sikdar |
| 2007/0088743 A1 | 4/2007 | Kikuchi et al. |
| 2007/0143178 A1 | 6/2007 | Citrin et al. |
| 2007/0156669 A1* | 7/2007 | Marchisio et al. ............ 707/4 |
| 2007/0156677 A1* | 7/2007 | Szabo ..................... 707/5 |
| 2007/0208719 A1 | 9/2007 | Tran |
| 2007/0255670 A1 | 11/2007 | Ruf et al. |
| 2007/0255698 A1* | 11/2007 | Kaminaga et al. ............ 707/3 |
| 2007/0260583 A1* | 11/2007 | Domine et al. .............. 707/3 |
| 2007/0260594 A1 | 11/2007 | Lewak et al. |
| 2008/0005086 A1 | 1/2008 | Moore |
| 2008/0071769 A1* | 3/2008 | Jagannathan ............... 707/5 |
| 2008/0077570 A1 | 3/2008 | Tang et al. |
| 2008/0140604 A1* | 6/2008 | Collier et al. .............. 707/1 |
| 2008/0147642 A1* | 6/2008 | Leffingwell et al. .......... 707/5 |
| 2008/0172374 A1 | 7/2008 | Wolosin et al. |
| 2008/0195601 A1 | 8/2008 | Ntoulas et al. |
| 2008/0228761 A1 | 9/2008 | Kei Leung et al. |
| 2008/0275877 A1* | 11/2008 | Bates et al. ............... 707/7 |
| 2008/0319947 A1 | 12/2008 | Latzina et al. |
| 2009/0106015 A1 | 4/2009 | Li et al. |
| 2009/0228281 A1* | 9/2009 | Singleton et al. ........... 704/275 |
| 2010/0042588 A1 | 2/2010 | Smyros et al. |
| 2010/0042589 A1 | 2/2010 | Smyros et al. |
| 2010/0042603 A1 | 2/2010 | Smyros et al. |
| 2011/0035380 A1 | 2/2011 | Stafford |
| 2011/0055241 A1 | 3/2011 | Lewis |
| 2011/0125728 A1 | 5/2011 | Smyros et al. |
| 2013/0054564 A1 | 2/2013 | Smyros et al. |

FOREIGN PATENT DOCUMENTS

| | | |
|---|---|---|
| WO | WO 2010/019888 | 2/2010 |
| WO | WO 2010/019892 | 2/2010 |
| WO | WO 2010/019895 | 2/2010 |

OTHER PUBLICATIONS

International Search Report and Written Opinion issue for PCT Application No. PCT/US2009/53884, dated Sep. 24, 2009, 8 pages.
International Search Report and Written Opinion issue for PCT Application No. PCT/US2009/53894, dated Sep. 28, 2009, 8 pages.
International Search Report and Written Opinion issue for PCT Application No. PCT/US2009/53899, dated Oct. 6, 2009, 7 pages.
International Search Report and Written Opinion issue for PCT Application No. PCT/US2009/53906, dated Oct. 16, 2009, 11 pages.

* cited by examiner

SYSTEMS AND METHODS UTILIZING A SEARCH ENGINE

RELATED APPLICATIONS

This application is a continuation application of U.S. patent application Ser. No. 12/192,775, filed on 15 Aug. 2008, entitled SYSTEMS AND METHODS UTILIZING A SEARCH ENGINE, which is related to co-pending and commonly assigned, and concurrently filed U.S. patent application Ser. Nos. 12/192,794, entitled "SYSTEMS AND METHODS FOR INDEXING INFORMATION FOR A SEARCH ENGINE," 12/192,834, entitled "SYSTEMS AND METHODS FOR SEARCHING AN INDEX," 12/192,84, entitled "SYSTEMS AND METHODS FOR TOPICAL SEARCHING," and 12/192,875 entitled "SYSTEMS AND METHODS FOR A SEARCH ENGINE HAVING RUNTIME COMPONENTS," all filed on 15 Aug. 2008, the disclosures of which are hereby incorporated herein by reference.

TECHNICAL FIELD

This application is related in general to information repository management and in particular to a search engine for retrieving information from memory.

BACKGROUND OF THE INVENTION

Computer users use search engines to retrieve information that meet specific criteria, from information stored on a computer system. For example, computer users may use search engines to search for information on the World Wide Web, on a corporate network, or on a personal computer. Typically, a user will provide a search term, which is one or more words, or a phrase, to the search engine and request that the search engine conduct a search for documents containing the search term. Depending on the search term provided to the search engine, the information returned by the search engine could be voluminous. Consequently, most search engines provide, to the user, relevance rankings of all the information returned to the user. The relevance rankings aid the user in determining which information the user should view to get the information the user needs.

Current searching technologies are represented by monolithic general-purpose search services that are based on broad-brush assumptions, which are typically derived from mass-market statistics about the information needs of individuals. Also, the current technologies attempt to personalize searching by collecting and maintaining personal data about users in central locations. Note that this personal data is subject to unauthorized use. The current technology provides search results based upon the personal data and the mass-market statistics. More specifically, the current technology relies upon linguistics and semantics to attempt to match search terms to documents using algorithms by trying to construe meaning from context.

Current technology has incomplete indexing of the data or documents that is to be searched. General-purpose search engines typically use the same basic approach to building an index entry for every document they include in their search universe. However, different engines use different assumptions and compromises in building their indexes. The assumptions determine what is left out of the index in order to keep the size of the index small. Typical search engines include a list of stop words or words that are very common to the documents being indexed. Stop words are words that are not indexed. Typical stop words include most pronouns, articles, and prepositions, and high frequency words. For example, in a database of patent documents, the word 'patent' may be a stop word.

The use of stop words is problematic for two reasons. The first reason is that stop words may have more than one meaning, with one meaning being very common, and the other meaning may be a suitable search term. In keeping with the above patent example, a document discussing 'patent leather shoes' would not have the word patent indexed. Thus, a user searching for such a document would not be readily able to find it. The second problem is that functional words, e.g. the articles, the pronouns, prepositions, etc., form the structure of language. By using these functional words as stop words, search engines cannot apply any kind of grammatical analysis to the index. Current search engines may try to parse phrases to maintain some context by defining a tree that links nouns and verbs together. However, current linguistics programs that use such natural language processing (NLP) parsing are only about 65% accurate.

Current indexing techniques also include indexing a metadata tag associated with a document rather than the document itself. The metadata tag typically comprises information such as document type, title, author, date, metadata, XML objects, other specific context information, etc. Consequently, forming an index from the metadata tag rather than the document greatly limits the accuracy of searches.

Another current indexing technique is to build a taxonomy of the database to be searched. A taxonomy is a hierarchy or decomposition of the documents to relate them to each other. In other words, a taxonomy parses elements of a group into subgroups that are mutually exclusive, unambiguous, and as a whole, include all possibilities. For example, the accepted biological taxonomy of living things is kingdom, phylum, class, order, family, genus, species. One problem with taxonomies, especially in technology, is that it typically requires between 6 months and 18 months to complete for a typical database. And consequently, the taxonomy is obsolete or out-of-date when completed. Also, the hierarchy of the taxonomy acts to limit the searching of the database by requiring searches to conform to the taxonomy, and thus this will reduce the accuracy of a search.

When a user enters a list of words to initiate a search, these search engines attempt to achieve the "best match" between the search term and the index of the documents. The results are displayed to the user in terms of a ranked list. Different search engines use different techniques to rank the results. One common manner is to rank the results based on the popularity of each hit in the result list. Sites or documents that are used more often would rank higher than those used less often. Another manner is to rank the results based on cites or links, whereby a document that is linked or cited more in other documents would be ranked higher than a document with less links or cites. A further manner is ranking by opinion, where documents or sites that are subjectively rated as influential would be ranked higher than those that are not. A still further manner is by payment, where sites that have paid fees to the search engine are ranked higher than those that have not.

BRIEF SUMMARY OF THE INVENTION

The present invention is directed to a system and method which provides search results from search terms provided by a user or application that match with documents in an information set. Embodiments of the invention involve a search engine that responds to a search request received from a user through an input interface. Other components of the search engine generate and maintain an index of the information that is available for searching.

The search terms are converted to a format that is used for the index. Both the search terms (ST) and the index are worked through filters and processes of the search engine, including a RealTime Search component that determines the precise intersections between the ST and the corresponding information set (ISet) members of the searchable universe. When the RealTime Search component has completed its processing, it passes the results to the Post-Search component, from where these results are prepared for, and transmitted to, the Return Interface.

A Pre-Search component of the search engine creates and maintains the index or indices of the searchable universe. One module of the Pre-Search component uses a crawler to locate and scan all documents for selected sets of information types in the information repository available that are searchable. This information is then formatted by removing extraneous information. A term unit (TU) array is created of all the TUs in the exact order of their appearance in each document. Other information about the document is also stored and formatted by this module, such as modified date, document name, title, etc. Each TU array is then indexed in one or more binary files. The binary format contains all the required information in an index file on an ISet member-by-ISet member basis. Note that the information is ISet member centric, not word centric. It is this index file that represents the searchable ISet for responding to search requests. After creation of the index, the index is maintained to reflect changes in the searchable universe, e.g. additions, deletions and/or modifications to documents.

An optional RunTime Search component can be used to modify the ISet to improve or enhance searching operations. The ISet may contain partial or total duplicates of other ISet members, or ISet members may contain duplicate sets of TUs. One module may be used to notify systems and/or users of similar documents, as well as the use of ungrammatical TU duplication within a document. This information is communicated back to the Indexer module of the Pre-Search component, which can then store this information in the index. Another module allows for topical searching of the ISet. This module analyzes the ISet, both within ISet members (i.e., intradocument) and within groups of IS et members (i.e., interdocument) for the potential of main topics and subtopics. The topic then is a common starting point for more refined search capabilities. It calculates the ISet's topical intervals (TIs) and provides them to the Indexer module for storage in the index. Another module allows for the index file(s) to be stored in cache. This module acts as a memory store until the RealTime Search component is triggered to respond to a search request, at which time this module makes its contents available to it as needed. Note that, at this point in time, the Indexer files used by the RealTime Search component reflect the ISet as contained in the cache.

When an SR is initiated, the RealTime Search component of the search engine begins operations. One module receives the search terms (ST) from an Input Interface. This module normalizes the ST into the proper form. Thus, disparate input interfaces can be used for the same RealTime Search component. Next, another module converts the ST into a faster, more efficient readable input form that is used for determining intersections between the ST and the ISet. A subsequent module expands the ST to include synonyms, acronyms, Boolean values etc., according to the implementation. Meanwhile, a Filter module operates on the ISet to remove any documents with noncompliant ST attributes, such as ISet members that do not have the correct date or are not in the required format, do not contain the correct topics, etc. The Filter also performs the function of communicating with the cache module for the actual index files that are required to be loaded. The output of this module is the unique ISet member structure that is sent to the Posit Block Collector module.

The Posit Block Collector module of the RealTime Search component operates to complete the intersection of the ST and the filtered ISet. This module eliminates any remaining ISet members in which the TUs of the ST are not found at least once or those that do not meet the document threshold (docT). This module also performs other functions to produce a posit block (PB) array or structure for each ISet member. PBs are the intervals between posits that contain the ST within the constraints indicated by the type of search (TOS). For example, with exact search there must be an exact correlation between the ST and the ISet member.

The Refiner module of the RealTime Search component receives the ISet member structure from the Posit Block Collector module. This module evaluates the PB relation to the ST for each ISet member containing a structured segment. For example, the module identifies the column name of the posit. This module also compensates for ISet member length to ensure the relevance scoring is properly weighted. Depending on the ST frequency of occurrence within a PB, one or more PBs are sent to be processed by the Processor module.

The Processor module of the RealTime Search component is a numerical processor that computes the number set (NSet) values, relevance scores, and the most relevant parts (MRPs) for the intersection of the ST and the ISet. An NSet is a set of numbers that represents the set of intervals that describe certain grammatical and/or syntactical conditions in the intersection between an ST and an ISet member, such as the replication of the ST within an ISet member's length. The relevance scores are then calculated based on the relevance equations applicable to the types of search involved. These equations are based on the merit of each ISet member and may not be based on any external factors. The MRPs are ISet segments containing the ST within the actual MRP excerpt length specified by implementation requirements. These outputs are passed back to the refiner module and modified, if necessary, before transfer to the Aggregator module.

As a single-location entity or as a hierarchal chain, the Aggregator module of the RealTime Search component collects all the information about an ISet member (e.g., relevance scores, MRPs, etc.) and places it in a single location for ultimately returning it to the user via a return interface. Depending on a given implementation, the Aggregator may also be responsible for translation of the numeric MRP values to the original words; this process is known as MRP decoding.

The Post-Search component of the search engine comprises a Returner module that places the information received from the Aggregator in its final correct form and returns it to the Return Interface, where depending on implementation MRP decoding may take place. From the Return Interface, the output is provided to the user.

One embodiment of the invention may be a search engine that is stored on a computer-readable medium, comprising a Pre-Search component that forms an index from a plurality of documents, wherein the index comprises numeric code that includes grammar embedded rules; a RealTime Search component that receives a search request from a user, converts the search request into the numeric code, and compares the converted search request with the index to form search results; and a Post-Search component that receives the search results and converts the search results into a format of the search request, and provides the converted search results to the user.

Another embodiment of the invention may be a method for searching for at least one document of a plurality of documents using a computer comprising forming an index from the plurality of documents, wherein the index comprises numeric code that includes grammar embedded rules; receiving, from a user, a search request comprising at least one search term; converting the search request into the numeric code; comparing the converted search request with the index to form search results; converting the search results into a format of the search request; and providing the converted search results to the user.

A further embodiment of the invention may be a computer program product having a computer-readable medium having computer program logic recorded thereon for searching an information repository, the computer program product comprising search engine that is stored on a computer-readable medium. The product comprises means for forming an index from a plurality of documents of the information repository, wherein the index comprises numeric code that includes grammar embedded rules; means for receiving a search request from a user, converting the search request into the numeric code, and comparing the converted search request with the index to form search results; and means for converting the search results into a format of the search request, and providing the converted search results to the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
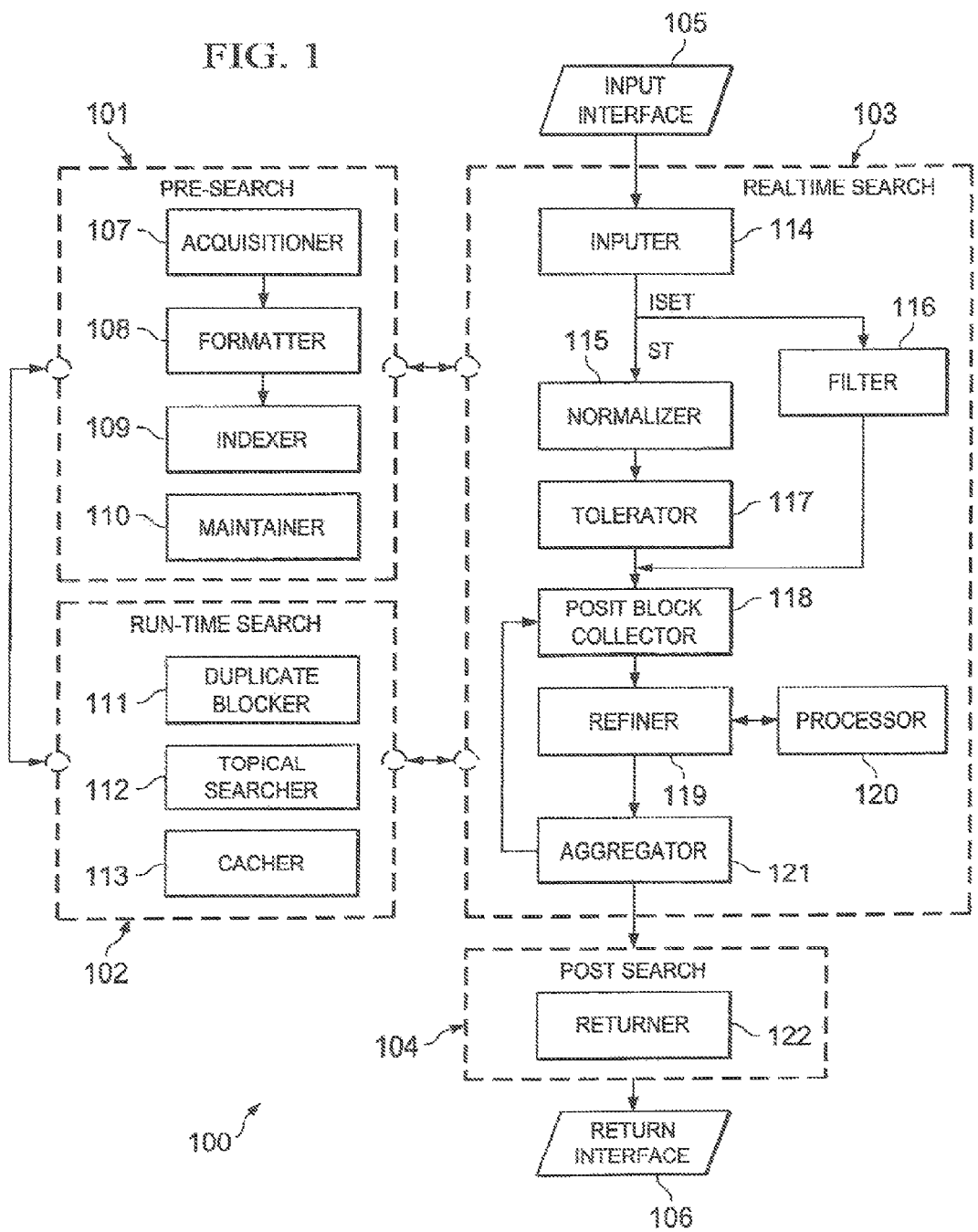
FIG. 1 is an arrangement of a search engine, according to embodiments of the invention.

Note that as discussed above, current search engine technology does not provide accurate relevancy rankings. In other words, current search engines give low rankings to desirable information and high rankings to undesirable information, and/or do not find desirable information.

There are primarily two reasons for inaccurate relevancy rankings. First, apart from an exact search, current search engines do not take into account how words of the search term appear in a document in determining the relevancy of the document. Rather, current search engines base rankings, in part, on identifying whether the words of the search term appear in the document and how often those words appear. Second, in current search technology, apart from identifying whether the words of the search term appear in the document, relevancy rankings are heavily dependent on criteria that may not reflect the user's needs. For example, current search engines rely on information about previous searches conducted by other users, expert authority on the importance of documents and link popularity. In essence, current search technology ranks the relevancy of information primarily on the forecasted need of the user and not on the actual need of the user as deduced from the information the user provides when requesting the search.

The accuracy of relevancy rankings is important because it affects the efficiency with which computer users retrieve information they need. There is a need, therefore, for an improvement in current search technology where information returned to a user after a search request by the user, is accurately ranked with respect to the needs of the user.

A search engine, according to embodiments of the invention, in simple terms, receives an input message that contains a request for desired information, processes the contents of the message through the components within the search engine, and returns an output message that represents the information requested, including, if desired, links to the original file(s) and other information about the file(s). The input message is in the form of a search request (SR) that includes one or more search terms (ST) and/or associated search criteria, e.g. name, date, file type, author, editor, publisher, format type, etc. Note this list is only limited by the format of the original file and host operating system; for instance, a plain text format (e.g., .txt) typically contains significantly less information than a word processing file (e.g., .doc). The search engine comprises various components, described below, that process the SR for a current information set (ISet) universe. The search engine returns the results of the intersection between the SR and the ISet universe, which is the basis for all processing. The search engine prepares the results and returns an output message in response to the search request.

The ISet is the information set representing the searchable documents that meet the search region and file filter restrictions for a search. The ISet may comprise structured and/or unstructured information source members or entries. A structured source is typically a database, which comprises a collection of one or more tables, with headers, records, and fields. An unstructured source is typically comprised of text, and may include embedded structured segments, e.g. tables and/or graphics (including imported graphics). The word "document" as used herein refers to a structured and/or unstructured information source. Thus, the search engine is capable of indexing and searching both structured and unstructured information.

A search engine, according to embodiments of the invention, may accommodate several types of search (TOS) requests for search terms, ranging from "Exact" to "Flex", "Bucket", and "Topical". One type is a Bucket Fetch (or b-Fetch) TOS, where the user requests the retrieval of all searchable documents containing the search term in whole, in any TU order, or in any TU position. Another type is an Exact Fetch (or e-Fetch) TOS, where the user requests the retrieval of all searchable documents containing the search terms precisely as entered, specifically in TU order and TU position. A further type is a Flex Fetch (or f-Fetch) TOS, where the user requests the retrieval of all searchable documents containing the search terms within a range of TUs that include either search term constrained TU position interruption or constrained TU order inversion. A still further type is a Topical Fetch (or t-Fetch) TOS, where the user requests the retrieval of all searchable documents containing the search terms within an information category (IC). Additional combinatorial search types, such as Query Fetch, and the Multi-Media Fetch for pictures and movies, as well as speech hardware and/or software support, can be added to the search engine. In addition, full application rendering of textual documents; i.e., photos, graphics, formatting (styles and text decoration) can be added by implementing one or more specialty indexes, such as findex and pindex). Note that a functional index or findex operates at the TU, fractional length (FL), or section scope. A findex efficiently encodes specific information about formatting that is common throughout multiple ISet member instances (such as bold, underline, font, border), making the storage of such information more distributable. A path index or pindex operates at various scopes. A pindex is an efficient encoding scheme that stores path and other file location information in a form that is distributable.

A search engine, according to embodiments of the invention, transforms some or all of the search terms and one or more ISets into numeric code, using grammar-embedded rules for characters, numbers, and symbols. The search engine uses mathematical relations and grammatically-controlled numeric pattern matches for its transform functions. Note that as used herein, "grammar" is used in the context of the rules applicable to human language, "syntax" is used to describe the rules that make up a programming language, such as C++ or Java, and "language" refers to human language and/or machine language.

A search engine, according to embodiments of the invention, may operate on an enterprise server or servers, on a personal computer, on a data storage appliance, and/or on a portable data device, e.g. an MP3 player, a personal data assistant, a cellular telephone, a camera, a smart phone, or any type of data storage device where data retrieval is needed or useful. A search engine, according to embodiments of the invention, is useful for portable data devices because the search engine and its associated ISet both have small footprints, meaning the size of the engine and the size of the ISet is relatively small, as compared to the stored data. For example, the search engine may comprise about 250 kilobytes, and the ISet may comprise a size that is about one tenth that of the stored data. Thus, the portable devices may not need to have their memory increased to use the search engine. Note that the search engine (or portions thereof) may be embedded into an operating system.

A search engine, according to embodiments of the invention as discussed above, comprises a plurality of components, for example, a Pre-Search component, a RunTime Search component, a RealTime Search component, and a Post-Search component. The Pre-Search component provides crawler and information acquisition, formatting, indexing, and maintenance functions. The Pre-Search component takes the documents to be searched and puts them into a searchable index. The RunTime Search component provides index refining and caching operations. Index refining operations include duplicate blocking and topical searching, while caching operations store the index in a memory for later use. The RealTime Search component provides handling of the input search terms, matching and filtering operations, numerical computations and relevance scoring, and aggregation of the search results. The RealTime Search component compares the search terms with the index, and performs relevance calculations. The Post-Search component provides transferring of the aggregated search results to the user for display or further application processing. The components of the search engine, including the Pre-Search and Post-Search components, may be customized, e.g. by user-tunable on-off switches to activate various modules and methods. Such customization may allow refinements to the user's search criteria, such as capitalization, synonyms, acronyms, and drill-down among others.

Note that the search engine finds and returns the structured and unstructured documents that form an intersection between the search terms and ISet members without any form of manipulation or interference. Thus, the search engine may operate without heuristics, linguistic analysis, nor scoring mechanisms, such as scoring documents based on popular or authoritative opinions, inbound/outbound links, and other pre-determined judgments. The search engine may have relevance equations and scoring procedures that reflect the direct merit of a given ISet member or searchable document to the user's search terms.

A search engine, according to embodiments of the invention, converts standard grammar rules, through mathematical relations, into mathematical equations. This allows a computer executing the search engine to efficiently process search requests without being computationally intensive. No heuristics or previous search results are necessary, because the mathematical equations are solved at run time for actual constructs of each search entry, thus accurately reflecting the grammar rules and their mathematical equivalents. This avoids the use of contextual-based linguistic parsing methods, which typically leads to arbitrary constraints or dependence on language analysis of tenuous logic, or probabilistic modifications of the given search criteria. Additionally, the search engine can operate in different applications through extension methods, by using a small data store that uses associative logic (e.g. a thesaurus) to support these methods. Extension methods can include a messaging system that sends well-formed messages between the search engine and any other applications or within the search engine at well-defined entry points, excluding the modules that have no interfaces required as they do only internal processing.

The search engine may be embedded within third party applications and/or may be a discrete application integrated with other applications through the interfaces. For a web service deployment, the search engine may be used to index and allow searches to be performed on Internet documents. The search engine may be deployed in a stand-alone application, a mobile application, or an enterprise application. The search engine may be implemented in a self-contained deployment, i.e. all components located in a single device, e.g., a computer, a laptop computer, personal computer personal data assistance, a camera, a phone, a cell phone, mobile phone, a computer server, a media server, a music player, a game box, a smart phone, a data storage device, measuring device, handheld scanner, a scanning device, a barcode reader, a POS device, digital assistant, desk phone, IP phone, solid-state memory device, and a memory card. Alternatively, the search engine may also be distributed in multiserver application, thus allowing for multiple instances of the search engine to work together in a collaborative way, (e.g., between mobile devices and enterprise servers), which increases the speed, scope, and/or precision of search. In other words, different components may be located on different devices. Also, multiple instances of the same components may be located on different devices and operate together. The search engine may be deployed to allow enterprise searches, which would allow large companies to use widely dispersed bodies of documented knowledge, and allow authorized users to access information wherever it is held. Implementation administrators can manage the indexing of the documents to deliver both user value and company confidentiality. Certain indexes may be replicated across multiple locations within the enterprise, including end-user devices. The highly compressed format of search results can then be decoded on the user machine instead of on the server, allowing the presentation of comprehensive MRP details without the need to pass large files across the network, until a full original document copy is actually needed by the user.

Note that the search engine may optionally contain one or more tolerances that may be used to control system behavior and affect the outcome of the return set of ISet members. A tolerance differs from a document filter, such as a date, because there is no simple yes/no or binary outcome. There are many outcomes that are possible that the search engine requires sensitivity to in order to more accurately and precisely return the results required.

The search engine uses the theories and methods of discrete and combinatorial mathematics to transform the search process into mathematical functions with numerical values. Operating within a runtime constraint set and unique relevance equations for each search type, these functions produce relevance scores for a user's specified search criteria. The search engine may use topics to widen or constrain search requests, and thereby allow the better user control of the search. Such topic information is storable within the binary format. The topic information may then be recalled to use as a filter to only allow documents with requested topic(s) to be passed through the filter. The topic information may be added to the index, thus allowing the topic categories to be available for rapid RealTime Search. Note that this may be performed based on document values, and not performed until after the search is completed. Topical information may further refine the results by only considering the MRPs that are contained within the requested topic(s) range or interval. Combinatorial mathematics is a branch of pure mathematics concerning the study of discrete (and usually finite) objects. This area of mathematics studies families of sets with certain characteristic arrangements of their elements or subsets, in an effort to determine what and how many combinations are possible. Discrete mathematics is the study of mathematical structures that are fundamentally discrete in the sense of not supporting or requiring the notion of continuity. Continuity or a continuous function refers to a function for which small changes in the input result in small changes in the output.

The one or more indexes or ISet, according to embodiments of the invention is numeric. This allows each index to be more compact than other indexes even when more document content is incorporated in the index. The index can include punctuation and capitals, if needed or desired. The index does not need to omit any words from the indexes, unlike conventional indexes that usually exclude a number of "stop words" that are assumed to be unimportant for searches. Although the numeric aspect results in the index having a proprietary format, the index allows for significant customization based on tolerances, as well as languages.

A search engine, according to embodiments of the invention, enables a user to include synonyms, acronyms, and/or other "switches" to focus the search. After processing, the search engine then returns to the user, via an output interface, the results of the search. Such results may be one or more answers, and/or one or more most relevant parts (MRPs) and their associated hot links, for each relevant ISet member, ranked according to their relevance to the user's ST.

The search engine, in part or in whole, may be embedded in a device that may be mounted or attached on a person's apparel or other material a person carries, on a person's body, or implanted in a person's body. The search engine may be activated by any form of communication such as touch, voice, motion sensor, electronically, optically, etc. Note that the search engine can be embedded in a laptop computer, a phone, mobile phone, a music player, a game box, a data storage device, measuring device, handheld scanner, scanning devices, barcode reader, POS devices (e.g. cash register), digital assistant, desk phone, or IP phone.

FIG. 1 depicts an exemplary arrangement of a Search Engine 100, according to embodiments of the invention. In this arrangement, the Search Engine 100 comprises four main components, namely Pre-Search component 101, RunTime Search component 102, a RealTime Search component 103, and Post-Search component 104. Note that in this arrangement Input Interface 105 and Return Interface 106 are shown to be separate from the RealTime Search component 103 and the Post-Search component 104, respectively. Other arrangements may have one or both of the Input Interface 105 and Return Interface 106 being integral with the RealTime Search component 103 and the Post-Search component 104, respectively.

Pre-Search Component 101

The Pre-Search component 101 is operative before responding to any end-user search request. The Pre-Search component comprises an Acquisitioner or crawler, a Formatter, an Indexer, and a Maintainer modules. The Pre-Search component 101 prepares files from various information sources into a consistent, searchable index format.

These documents are referred to as information set members or ISet members. For instance, information that requires searching may be in a word processing file, or a portable document file, a database, or others. These disparate forms must be put into a consistent format to allow better searching operations across a variety of file formats. This is the process of an ISet member being created and stored in an index. An index is a collection of ISet members. The index is the overall store of ISet Universe information at potentially all operating scopes, depending on implementation, in a searchable format that is efficient and distributable. It includes any number of supporting encoding schemes (such as windex, pindex, etc.) This is itself a file format that can be used by any application.

Acquisitioner Module 107

The Pre-Search component 101 begins its operations with the Acquisitioner module 107. This module operates similarly to a crawler, and scans the associated information repository or repositories for certain information types. This module locates and scans all documents for selected sets of information types (e.g., *.html, *.xls, *.doc, *.ppt, *.pdf, etc.)

in the information repository or repositories available to the system that comprise the searchable universe. This activity is similar to the crawling function used on the Internet, on an enterprise network, or on a single device (such as a laptop or a smartphone). The documents, thus located and scanned, are stored in memory, along with source data such as date, location address, etc., for transmittal to the Formatter module 108.

Formatter Module 108

The Formatter module 108 removes all extraneous information, such as meta-tags, from the information received from the Acquisitioner module 107. The remaining information is stored as term units (TU) in a TU matrix in a storage medium. A term unit is any set of characters (e.g., words) or symbols separated by a space. The matrix stores all TUs in the exact order of appearance, as well as any document attributes such as a hard drive or network ID, modification date, table information, document name, etc. This information is provided to the Indexer module 109, which is the next module of the Pre-Search component 101.

Indexer Module 109

The Indexer module 109 module uses the TU matrix to create a numeric, binary representation of the information in a compact and efficient format. This representation comprises the searchable universe or ISet used by Search Engine 100. Note that the index form is preferably document centric, and not word centric. This representation can be stored for redundancy as a set of indexes on disk. Terms are stored in a windex, which is a numerically encoded term list. These index(es) and windex(es), along with other specialized index forms that can be created, form the information set (ISet), which is the binary format that is searched during search operations.

The Indexer takes the TU listing, and the file characteristics (if any), and converts this information into a set of indexes that are used to both efficiently and accurately reflect the document's information. TUs are identified by a "word" index value (this is based on the tolerances required by the implementation) and are stored in a single format, called a windex. Other information derived from the TUs in order and the document's characteristics are also calculated and added to the index.

The Indexer takes the TU listing, and the file characteristics (if any), and converts this information into a set of indexes that are used to both efficiently and accurately reflect the document's information. For instance, path names for locations of documents may be stored in a pindex; formatting, including links and embedded elements, may be stored in a findex. Thus, the basic indexing strategy can be extended to support any kind of repetitive information within an ISet. This allows the index format to serve as an application format, allowing applications to use a searchable format in addition to other tasks required to be performed on the information.

The basic information that should be collected by an index is: document characteristics (such as modified date, file format); the document type (structured or unstructured, or dual); structural information of structured segments or documents; the TUs; the functional-length (FL) indicators; the TU Type; and the position of the TU or posit. Depending on other modules, more information can be stored in the index as it supports any possible module that needs to write information to the index (such as the Topical Searcher 112 and Duplicate Blocker 111 of the RunTime Search component 102, discussed below). The specific order and method of storage is dependent on implementation.

Document characteristics refer to the qualities of the document that may be suitable for filtering by searchers. For instance, all documents must be uniquely identifiable. For example, the document address may be the unique identifier of a document. Other document characteristics, such as modified date or document title, may be stored by the index. There is no limit on the number of document characteristics that can be stored.

The document type is a special case of a document characteristic and it refers to the inherent relations indicated by the document. A structured document implies that the entire length of the document is built around a set of relations. The most common type of structured document is a relational database, where columns have specific relations and a set of columns or a row have a specific length. Any kind of document that contains such a relation is considered a structured document. An unstructured document contains no such relations; the text occurs without any other relations, except for the inherent grammar and/or syntactical relations. This would be a word processing file, a presentation file, a text file, or others. A third document type also exists, whereby an unstructured document contains structured segments, such as an embedded table or a database. This type of document is called a dual document; whereby there are both unstructured and structured elements. Note that any kind of metatagging, such as XML, that provides a structure for a document, is typically not considered to be a structure by the search engine.

The stored TUs are what are searched. These comprise the total set of TUs available in a specific document. Note that only those TUs visible to the user are indexed, and metatagging or other such markup TUs may not be included in the actual TU set for a given document. However, these aspects may also be indexed these values if required. The TU type refers to the function of a TU within a given grammar/syntax. There are two basic types: the functional TU (FTU) which is those TUs that contain no unique meaning; and the content TU (CTU), which is those TUs that contain a unique meaning and form the basis of most search requests. These are identified by the communications ID (Comm ID) that identifies the grammar/syntax used by the search engine at the time of indexing. Each Comm ID requires a set of FTUs to be identified and stored; the CTUs are all the remaining TUs not in the FTU set.

The following are some of the English language FTUs: about, above, across, after, against, along, among, an, and, another, any, around, as, at, before, behind, below, beneath, beside, besides, between, beyond, but, by, concerning, despite, during, each, either, except, excepting, for, from, her, his, in, into, its, like, my, near, neither, nor, of, off, on, onto, or, our, out, over, per, regarding, round, several, since, so, some, that, the, their, these, this, those, through, to, toward, under, underneath, until, up, upon, what, whatever, whatsoever, which, who, whom, whose, with, within, without, yet, your. Note that this list is not exclusive as other FTUs may exist. Other languages or other dialects of English may have different or additional FTUs.

Lastly, the position of each indexable TU is assigned an integer to indicate its position in the document. This is referred to as its posit.

Figure 2:
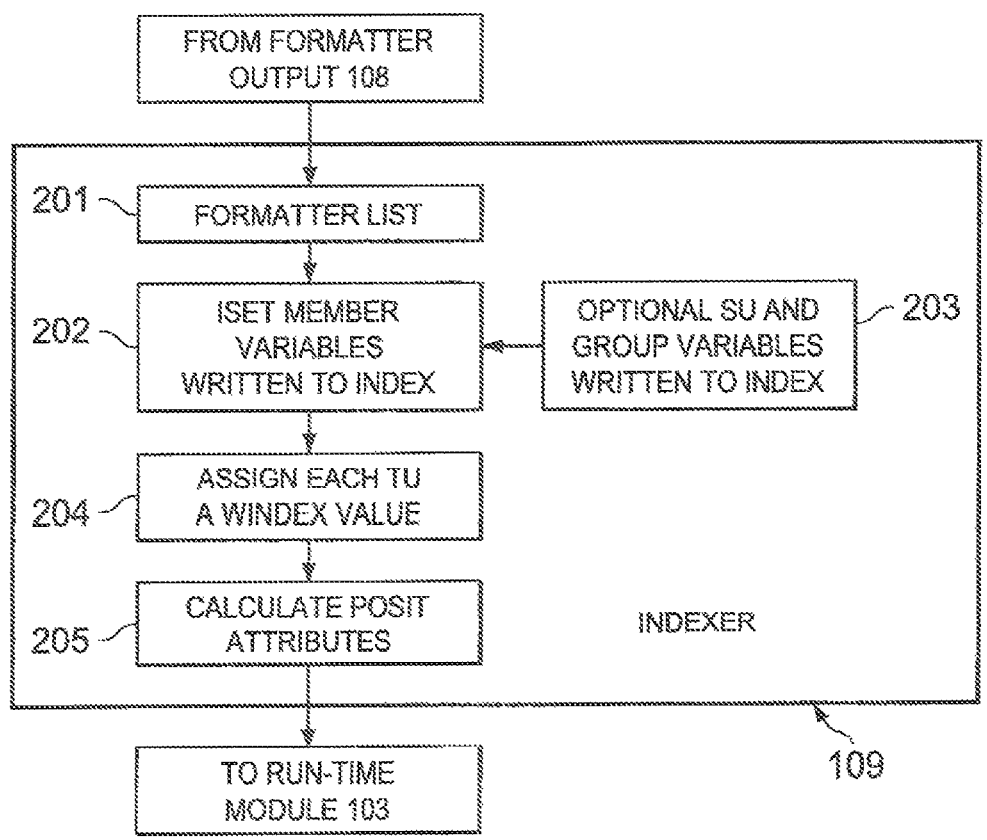
FIG. 2 depicts an arrangement of an indexer of the search engine of FIG. 1.

FIG. 2 depicts exemplary operations of the Indexer 109 of FIG. 1. The Indexer 109 receives that Formatter list 201 as the input from the Formatter 108. The Formatter List 201 is a list of TUs, punctuation, and other characteristics of the ISet documents. The Indexer 109 will then build the index using the list. The Indexer 109 views the documents of the ISet as a plurality of layers, some of which can be indexed, and other layers that cannot be indexed.

Figure 3:
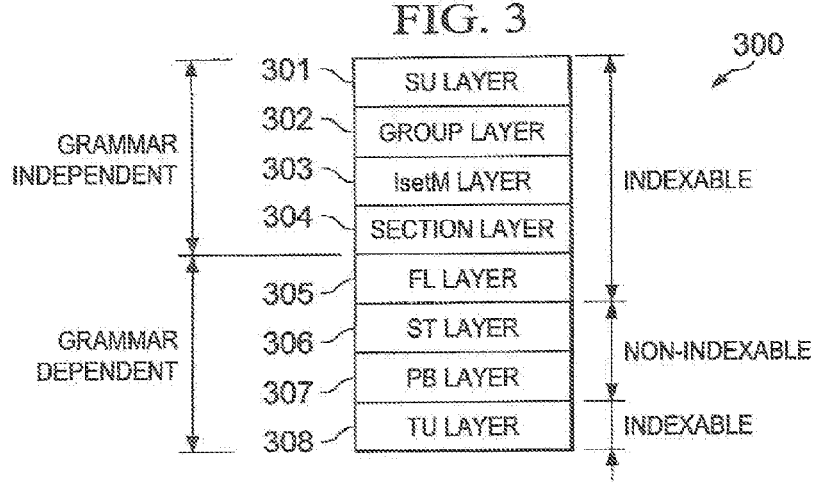
FIG. 3 depicts an arrangement of processing layers for the search engine of FIG. 1.

FIG. 3 shows the demarcation between the grammar dependent and independent layers, along with the indexable layers. The Search Universe (SU) Layer 301 is the entire document repository, representing all the information available to a user or system, that is available. The Group Layer 302 is a portion of the SU that is grouped using some kind of mechanism or filter, such as a set of documents that have the same file type or are exist at the same network location. The ISet Member Layer 303 is a single document in an SU, and may be identified as a unique file such as a word processing document or URL, e.g. \\serverA\dir1\dog.doc. The Section Layer 304 is a part of a document identified using a specific criteria, such as a set of TUs that belong to a topic. The Fractional Length (FL) Layer 305 represents a group of term units (TUs) that have established endpoints derived from either the beginning or end of a document or are characterized by the presence of the pattern (CTU, FTU), wherein FTU is the beginning of a new FL. The Search Term (ST) Layer 306 is the actual entry provided by the Input Interface.

The Posit Block (PB) Layer 307 is a grouping of posits that contain one or more repetitions of a search term. The posits vary in length based on runtime results. They may contain other TUs that are not part of the search terms, but occur within constraints between the STs that are found. The Term Unit (TU) Layer 308 is a term unit, such as a word, number, or code, that is separated by a space or other known TU delimiter for the language or syntax being used.

In block 202, the Indexer writes the ISet member variables to the index. Any descriptors required to be available to eliminate ISet members are considered search criteria and are established therefore based on implementation. Once such ISet member variables are known, they are populated during processing and then available for addition to the index for storage.

In block 203, the Indexer optionally writes SU group variables to the index. As an optional step, there may be a need to further identify an individual index, especially in distributed environments. Therefore, many of the ISet member group variables listed above, as well as others deemed necessary by implementation, may be established. These can be stored in a reserved place in the index, usually at the top, and occur only once per group in the first index in such a group.

In block 204, the Indexer analyzes each TU and assigns a windex value. Each TU is analyzed for what kind of value it has, either CTU or FTU, and is therefore assigned a windex value based on which value. This is done through the establishment of a set of CTU values within a language. In addition, in languages such as English that contain punctuation require different handling, and these may also be established in a set. Based on the FTU and the possible punctuation set, the windex value is known and assignable. Any other value not already used by the indexer for a specific scope (such as ISet universe or ISet group) is assigned a CTU value sequentially, after the range of the FTU and possible punctuation values.

In block 205, the Indexer calculates the posit attributes. Posit attributes include information that relates to the TU at that point in the document. The calculation that is typically performed is a fractional length calculation. This calculation is based on the pattern and defines the fractional length is occurs in the document. Any length at or below a certain number is considered an FTU. That FL continues until the pattern changes to indicate that a CTU is adjacent to an FTU, and that will start a new fractional length. Note that fractional length does not correspond to a language phrase. This organizes the document into grammatical units that can be further processed. This is the basic posit attribute that is common to all forms of documents, and that can occur in both structured and unstructured documents. This output is provided to the RealTime Search component 103.

The Indexer works with four types of posit attributes. The first is a fractional length posit. The fractional length indicates the length of the posit. For example, consider the following "The dog went home." In this case, the fractional length indicator is applied to "the" and is a set of 4. The second type of posit attribute is a duplicate attribute. This attribute indicates that a document is a duplicate of another document or a part of a document is a duplicate of another part. This attribute indicates how many posits are duplicated. For example, consider the following "The dog went home. He had found his bone." In this case, the duplicate attribute is applied to "the" and is set at 5. This indicates that "The dog went home." has been repeated elsewhere in the ISet universe. The third type of posit attribute is a topical search attribute. This attribute identifies one or more topics that the document is associated with. For example, consider the following "The dog went to the store. Then the dog decided to go for a ride in the car." In this case, the posit attribute that indicates the topic "dog" usually requiring the beginning and end of the topic length, may either be applied to the posit in the index's posit listing or in the best mode, is indicated at the ISet member section for each ISet member that contains topical information. The fourth type of posit attribute is for structured documents. These attributes indicate where structured fields begin and end. In documents that are structured or unstructured, only an ISet member variable needs to be set. If the document contains structured segments, then the beginning and ending posits for each segment must be known. These may either be stored at the posit section in the index, or in the best mode, is indicated at the ISet member section for each ISet member that contains structured segments (i.e., not all structured).

Maintainer Module 110

The last module of the Pre-Search component 101 is the Maintainer module 110, which is an optional module. The Maintainer module 110 updates the ISet with changes to the source documents of the associated information repository. Thus, any additions, deletions, and/or modifications (e.g. updates) to the documents of the repository would be located by the Maintainer module 110. After locating a change to the repository, this module may cause the Pre-Search component 101 to index only the changed portions of the repository, or may cause the entire repository to be reindexed. This may involve operating some or all of the modules of the Pre-Search component. The Maintainer module 110 may operate at a specific time(s) and/or specified time intervals. This module may be customized for a given implementation.

RunTime Search Component 102

The RunTime Search component 102 is operative after the Pre-Search component 101 and either prior to or concurrent with the RealTime Search component 103. The RunTime Search component is optional, and provides caching operations and index refining, such as duplicate blocking and topical searching. Embodiments of the search engine may have some or all of the modules of the RunTime Search component.

Duplicate Blocker Module 111

One optional module of the RunTime Search component is the Duplicate Blocker module 111. This module operates to identify documents of the repository that have duplicate parts or are duplicates of other documents in the repository. This module then modifies the ISet of the Indexer 109 to reflect duplications. This notifies other systems and users of similar documents that are in use as well as the use of ungrammatical term unit (TU) duplication within a document. The Duplicate Blocker normally stores information in the Indexer for any ISet documents containing duplications, either as a set of TUs (i.e., TU duplication or TUD) repeated outside of grammar constraints, or parts or all of a document that repeat within the searchable universe. Note that duplications may be either a set of TUs repeated outside of grammar and/or syntax constraints, or parts or all of a document that repeat within the searchable universe. This module makes searches more efficient.

The level of precision that the module allows is controllable based on user or system requirements. For instance, document duplication has two basic types, namely section and full document duplication (ISet Member). Section duplication occurs when a portion or section of the document is exactly the same. Therefore, it is sometimes necessary when this tolerance is turned on that the segment of the duplication is noted. This is done by a length counter to indicate the number of posits that are duplicated. Lastly, the TUD is calibrated based on the number of TUs that are found to have duplicated.

The TUD operates by indicating documents that contain multiple term unit instances that appear without grammatical form. The TUD operates within each document. For instance, a common way to increase relevance is to constantly repeat a term or set of terms over and over again, such as "dog house dog house dog house dog house dog house". The TUD can detect this because of the ability to quantify FLs. For instance, if a FL continuously repeats with the same terms, including the FTUs, then there is no grammatical meaning, and therefore this group should be blocked from consideration as to the relevance of its parent document. This occurs in the Internet by either invisible text, header entries, in commented code blocks, or other devices. Since the goal is always to increase the word count, which in turn, should increase relevance, the search engine will not tolerate certain conditions. Therefore, for each search type, the search engine can incorporate TUD density calculations to protect the user from such types of inflated document scoring.

If a document is fully duplicated, then there are two conditions, namely exact and subset duplication. In exact duplication, document A and document B are exactly the same, including the length of the document in posits and all other TU block attributes. In subset duplication, document A is fully contained within document B. In fact, it may be possible that document A and document C are fully contained in document B, and so on. All the TU block attributes that are in both document A and B would be exactly the same as those in document C for that section where the match occurs.

Topical Searcher Module 112

Another optional module of the RunTime Search component is the Topical Searcher module 112. This module analyzes documents in a part or all of the searchable universe to determine the topics that exist, both within each document and within groups of documents. The Topical Searcher module 112 uses the ISet results of the Pre-Search component 101 to efficiently calculate the topical intervals (TIs) that exist for the searchable universe. The results of this module can be stored directly in the ISet of the Indexer 109 for maximum flexibility of use.

Figure 4:
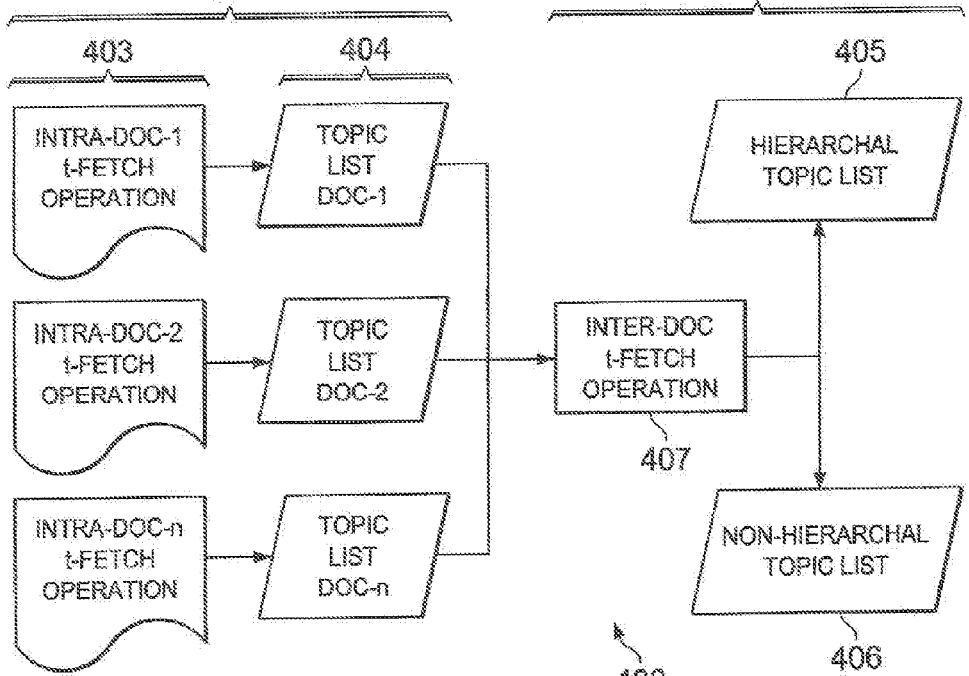
FIG. 4 depicts a flowchart of a topical search process, according to embodiments of the invention.

Topical search involves the quantification of identifiable section(s) of a document that relate to a central theme or a topic. In searching, the need to qualify a search term (ST) by restricting it using an identifiable topic length or interval is a useful function in many cases. In order to accomplish this, the document must first be indexed by the Pre-Search component 101, as described above. The grammatical and/or syntactical boundaries established by the initial indexing are used, as well as the TU type determination. If required, the Duplicate Blocker module 111 should be run before this module to detect ungrammatical/unsyntactical TU duplications, if required or necessary by the implementation. Then, the Topical Searcher can function. An exemplary process 400 is shown in FIG. 4.

Topical search occurs in two phases, namely an Intradocument phase 401 and an Interdocument phase 402. In the Intradocument phase 401, each document is analyzed on its own merit for the topics that occur. The phase involves locating the individual TUs that meet the requirements for the inclusion as potential topics, filtering out the noise TUs, which are the set of FTUs and CTUs that are nontopical for the given Comm ID (these can be stored in the thesaurus or general dictionary). Note that filtered words may be affected by tolerances. A frequency analysis may optionally be done to determine the potential topic set. Then, a modified form of the f-Fetch and other Intradoc t-Fetch 403 operations are used to determine those topics that contain multiple TUs. Multiple-TU topics are then further refined, if necessary, by a set of comparisons called Multiple-TU Commonality. Then the list of potential topics is adjusted. Optionally, another filter may be run on the topics. The potential topics now include both single-TU and multiple-TUs. The potential topics are now in their initial ranked order.

Single-TU topic posits that occur to multi-TU topics are eliminated. At this point, both single-TU and multiple-TU potential topics have their TIs recalculated and their overlap values adjusted accordingly. From this, it is possible to determine the breadth of the topic's scope, which determines the main topic and subtopic values. The distribution analysis is also recalculated, which is designed to limit the size of the TI based on spurious and nonconsistent usage within the TI length. This provides an overlap for each TI. Once these have been completed, the main topic, if it exists, is determined, along with the subtopics in the Topic List Document 404.

Main topics are identified as those that have a longer length of other topics in the document. A subtopic either is fully contained within a main topic, if one exists, or is completely separate, as this is hierarchical in nature. If no main topic exists for a document, then only subtopics are returned and the main topic value is null. Further, subtopics are also hierarchically related by using the overlap characteristic; if they are overlapped within another subtopic, then they are a child of that subtopic. A terminating point of a hierarchy is a subtopic that has no subtopic contained within it. If required by an implementation, these are then stored in the index in the TU block so they are available for search requests.

In the Interdocument phase 402, the results from the Intradocument phase form the basis for the Interdocument analysis. In Interdocument analysis, a group of documents are analyzed for topics that are common to them by using modified form of the f-Fetch a set of Interdoc t-Fetch 407 operations. Two types of Interdocument analysis is possible, namely Hierarchical 405 and Nonhierarchical 406. In hierarchical analysis, the hierarchy from the Intradocument analysis is preserved; that is, the ordering of main and subtopics must match in order to be included. For instance, if a main topic="canine" in document A and a subtopic="canine" in document B, then if the threshold for "canine" to be included in the results is met when "canine"=main topic, only document A and the others that contain "canine" as a main topic are included in the resulting Interdocument hierarchy. Also, all the subtopics under "canine" also reflect the underlying hierarchy from Intradocument analysis.

In nonhierarchical analysis, the main and subtopic hierarchy from the intradocument is ignored, and only the occurrence of the topic is necessary for inclusion into an interdocument topic listing. For instance, only the occurrence of the topic "canine" is required. Using the example above, "canine" as a main topic and "canine" as a subtopic would mean that both document A and document B would be listed as documents under the topic "canine". This type of search is useful in general search applications where the amount of the document that contains the term is not required or that a hierarchical understanding of how the topic was derived, such as the subtopic "husky" in document A is not important.

The Topical Searcher module 112 can be refined like any other module by the use of tolerances. For instance, the synonym tolerance may be used at both the TU or the fractional length (FL) level to capture synonyms that for the implementation are considered to be close enough to be considered the same repetition of a topic. In addition, the synonym tolerance may also be used to determine the uniqueness of a TU within the document. While multiple tolerated TUs within the document would count as topic indicators, a term with a high number of synonyms versus terms with low number of synonyms distinguish topics better, and therefore may be used to modify the order or even the existence of potential topics in come implementations. Other tolerances at the FL-functional-scope level and below may be used with the Topical Searcher to further refine the results, such as stemming, acronyms, and abbreviations, among others.

The Topical Searcher module 112 can function in one of many scopes; this is especially useful in the distributed implementations of the search engine. A scope is defined as what portion of the searchable universe should be included in the interdocument phase; this allows for documents to be divided in a variety of means, including departments, disciplines, or other delineations. For instance, in the same searchable universe, topical search can be run for a group of documents in a particular network node; another topical search may be run for a group of documents in a geographical location, which may include the first group of documents, yielding potentially different interdocument topical results.

Cacher Module 113

A further optional module of the RunTime Search component is the Cacher module 113, which is a cache or a memory store of the ISet of the Indexer that is made available to the RealTime Search component 103 during search operations. In the Search Engine 100, ISets and/or index files may be cached for several reasons. Since the Search Engine 100 has no locality required of its information, the ISet does not need to be stored locally with the RealTime Search component 103. Thus, for arrangements where the ISet is stored distant from the RealTime Search component 103, a cached stored version local with the RealTime Search component 103 may be used.

The Cacher module 113 acts as a relay between the storage device and the memory location of the RealTime Search component 103. The RealTime Search component will call the Cacher, if required by an implementation, to get the Indexer information loaded into memory so that there is little or no latency in processing the data. Since the documents that comprise the Indexer must be analyzed on their own merit, the Cacher must be able to send data in sufficiently large enough chunks to be practical for a given network configuration.

Thus, one function of the Cacher is therefore to keep things in memory so that the RealTime Search component's host machine does not need to store the information except when its necessary. For multithreaded RealTime Search, serving several search requests at the same time, there is a high possibility that the same index files will be required on a repeated basis. However, the index files do not need to be in memory for long periods of time, minimizing the space problem. This is done in exchange for easier maintenance of the index files, which is vital as documents become more transactional in nature.

RealTime Search Component 103

The RealTime Search component 103 operates after the Pre-Search component 101 and either after or concurrent with the RunTime Search component 102. The RealTime Search component 103 provides handling of the input search terms, matching and filtering operations with the ISet, numerical computations and relevance scoring, and aggregation of the search results. The component begins operation when a search request, in the form of one or more ST and/or search criteria (e.g., TOS, date range, etc.), is received from the Input Interface 105 by the Inputer module 114. This input may come from either a user or another system. This component then processes the search request based on the parameters set forth by the user or system, as well as internal search engine parameters to locate all MRPs in each document available at the time of loading the index or indices into memory. This process completes when the relevance calculations produce the final scoring, and the rank and sort applied to the results are complete.

Note that the search term always contains at least one content TU (CTU) or may contain more CTUs, and/or it may contain one or more functional TUs (FTUs). All CTUs of a search term are considered "keywords" (KWs) for the purpose of searching. Note that in most languages, including English, any set of characters (e.g., words) or symbols separated by a space, will form a TU.

Input Interface

Note that in the embodiment shown in FIG. 1, the Input Interface 105 is not part of the RealTime Search component 103, but is discussed here for illustrative purposes. Other embodiments may have the functions of the Input Interface 105 internal to the RealTime Search component 103 or combined with the Inputer module 114.

Figure 5:
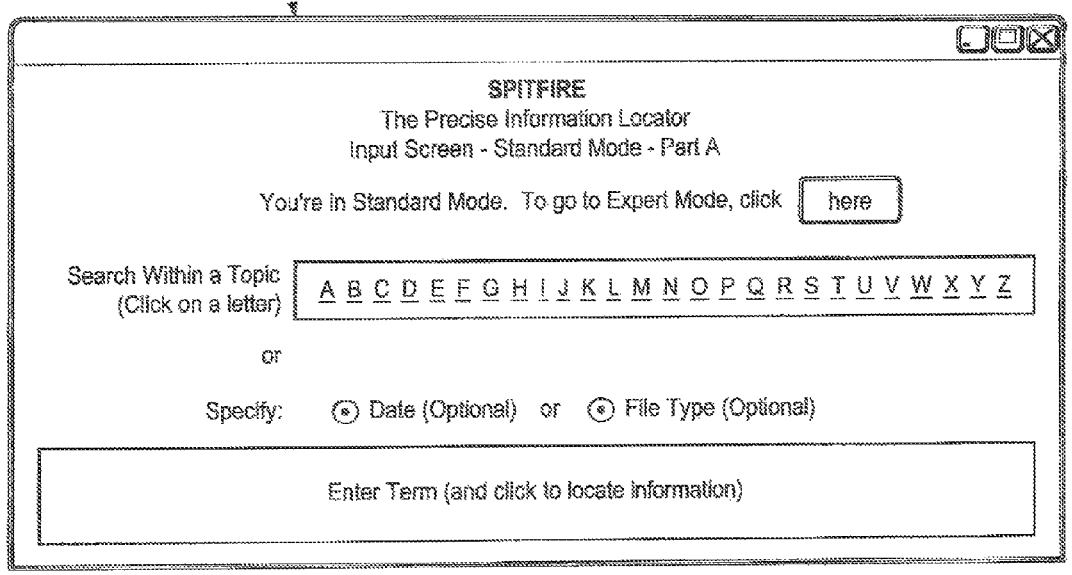
FIG. 5 depicts an example of an input interface, according to embodiments of the invention.
Figure 6:
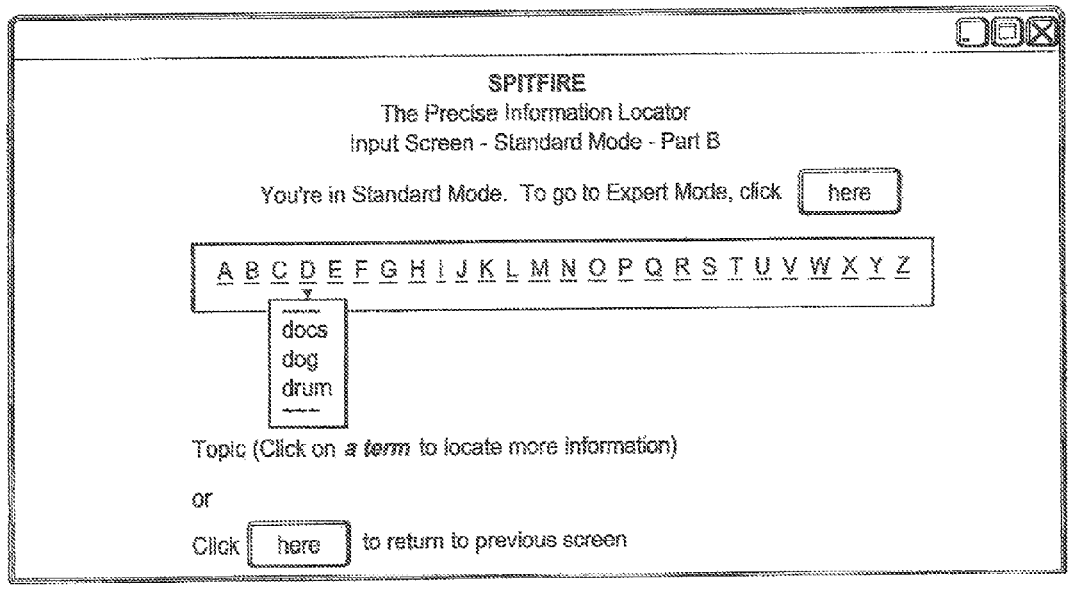
FIG. 6 depicts another example of an input interface, according to embodiments of the invention.
Figure 7:
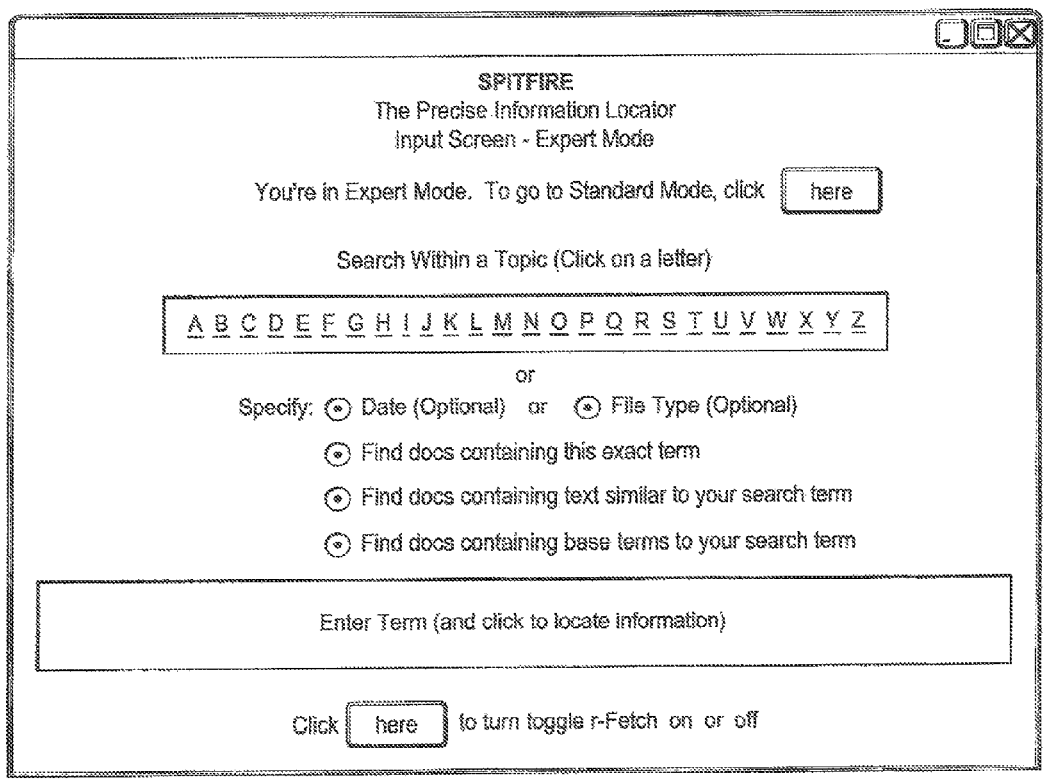
FIG. 7 depicts a further example of an input interface, according to embodiments of the invention.

The Input Interface provides a way for a user to operate the search engine, and search the indexes for a desired search term. Note that the specific interface design is subject to the needs of a given implementation. For example, FIG. 5 depicts an example 500 of an input interface that may be used for basic searches, such as a b-Fetch, e-Fetch, or f-Fetch, or may be used for discovery searches, such as a t-Fetch. As shown in FIG. 5, the Input Interface may be a graphical user interface. These search types will be explained in more detail below. FIG. 6 depicts an example of a GUI that is presented to a user after selection of the letter D from the GUI of FIG. 5. Selecting the letter "D" for a topic category causes a drop-down menu to appear that offers all the topics starting with "D" from index files. FIG. 6 also illustrates the option of continuing the subtopic drill down or returning to the previous screen to restart the topic search or to perform a Basic Search. FIG. 7 depicts an example of a GUI that is presented to a user after selection of the expert mode button from the GUI of FIG. 5. Note that the GUIs of FIGS. 5-7 are for illustration purposes only, as other GUIs could be used.

Inputer Module 114

The Inputer module 114 is an entry point into the search engine. In this arrangement, the Input Interface 105 operates to convert the search request into a form usable by the search engine. Note that several different types of interfaces may be serviced by the same application based entirely on implementation requirements. The Inputer also receives the ISet from the Pre-Search component 101 and/or the RunTime Search component 102. Note that during the RealTime Search component operations, data may be transferred from the RunTime Search component 102, (e.g. the caching operation), which is used to store information for real-time operations, if necessary. The search terms are processed through two sequential modules, namely Normalizer module 115 and the Tolerator module 117.

A search request (SR), in the form of an ST and its attributes or search criteria (e.g., TOS, date range, etc.), is made through the Inputer module 114. The Inputer provides an interface, either with another system or directly with a user, that provides the ST and its search criteria to be used by the search engine. The module takes data from the Input Interface and routes it to the correct modules within the RealTime Search component 103, based on whether the input deals with the ST or the document attributes (such as modified date), or topic qualification (i.e., restricting the scope to specific topics).

Input data is typically in the format of a data packet that comprises a network ID, a user ID, docscope variables (optional), tolerances (optional), TOS (optional), ST, Comm ID, drill down set (optional), and/or other fields, if needed. The network ID value is the address of the sender, such as the IP address of the sender. This can be provided, for instance, in the HTTP interface, and it can be any addressing size. The user ID is optional, and is used to handle access control list (ACL) values. The network ID plus the randomly generated search ID value equals the search request ID or SRID, if the user ID is not used; else the user ID is ANDed to the randomly generated search ID to make the SRID. The docscope variables are the document attributes that are required by the user interface to be sent. This is an optional field, since some interfaces will not require this or some implementations will have default values. Tolerances are named as text so that there is no need to keep translation tables. The tolerances should be named consistently throughout, but the order in which they are stored will change. Therefore, the text version should be named by the interface and sent to the Inputer. This is an optional field, since some interfaces will not require this or some implementations will have default values. The TOS value should be fixed throughout the application and only has to support the number of TOSs for an implementation. The ST length has a maximum based on implementation, and the length is tested internally. The Comm ID field is only required if a RealTime Search component supports more than one language or syntax. The Comm ID has a default value of English. Note that other languages can be added as needed. The drill down field is reserved for application use only. Application developers who wish to perform operations that require specific drill down information will use this field to indicate the range of documents to be included in the drill down and other data. Other fields may be added depending on implementation requirements; these are added to the Input Interface as well as to the Inputer. Note that at least one TOS must be identified if the Topical Searcher module 112 is not used; otherwise, a topic search would count as a TOS.

Normalizer Module 115

The Normalizer module 115 converts the search terms into a faster, more efficient readable input form using the current windex. The module may be called as many times as there are windexes encountered in the ISet. This input form is sent to the Tolerator module 117. Then, TU structural analysis is done.

The Normalizer takes the ST as inputted by the user and convert the ST into the form that is used for determining intersections between the ST and the searchable universe. There are two basic phases to normalization, namely windex translation and TU structural analysis. In windex translation, the current windex is identified for each index file and used to translate the ST. In structural analysis, the FLs, TU types, and posits are assigned. The output of the Normalizer module contains all the necessary information for processing the ST. The windex translation may be re-run, and if multiple windexes are used in the searchable universe.

The Normalizer keeps track of the windex and index file relation in order to properly prepare the ST. For instance, the Normalizer should be sent a message after the Filter module 116 has processed the last index file for a specific windex. This should indicate to the Normalizer that a windex translation is necessary for the ST for the search engine to continue processing index file items. Windex translation is the process of converting the ST text into the current index-encoded values. There is a 1:1 correspondence between the number of windexes for a given implementation and the number of times windex translation is done. The main output of windex translation is, in order, the windex equivalents of the TUs used in the ST.

Punctuation, capitalization and the wildcard tolerances affect the windex translation by modifying the scope of the initial binary search into the windex array. This is explained further with regards to the Tolerator module 117.

Punctuation, if used in the entry, is always included in the windex listing. The Tolerator will either keep or discard punctuation used in the entry based on the tolerated values. Therefore, punctuation is considered a pass-through value and is assigned a windex value if required (used) by an implementation.

If capitalization tolerances are in effect, then a match of "dog" and "Dog" are not equal; therefore, if only dog is found, then the entry is not considered a match. If capitalization tolerances are not set, then "dog" and "Dog" are equal, and both would be considered a match. This must be handled in the process, which marks for each FL-level and below tolerance the range of effect of the tolerance, based on the length in posits as indicated by the input message or Input Interface. All tolerances must be indicated by only the tolerances like capitalization, wildcard, and Boolean processing issues for windex translation. One wildcard is used per letter in the example; this may be changed based on implementation since a special character or an input indicator may be used to indicate the number of wildcard characters. Thusly, "d*g:" would not find "ding" since this character in the current implementation only indicates a single character.

If a wildcard is used, such as in "d*g", then all TUs in the windex that match that pattern are returned, and a grouping and value of the tolerance are shown. The order is alphabetical, so "dig" comes before "dog" and "dog" comes before "dug". There would be three wildcard tolerated values of equal weight returned by this function.

A Boolean tolerance is used when a posit has more than one value associated with it or a group of posits has more than one value associated with it. Therefore, the windex equivalents need to be found for the terms, without regard to whether a group is found or not. This requires both a grouping value and the extra terms that are a part of each posit. The Boolean is an input to the Normalizer, so the range is known. This allows the conversion for the windexes to take place. For instance, if the ST=The dog BOOLEAN OR husky went shopping, then either "dog" or "husky" must be found or no value is found in the windex for that posit in the ST.

Once the windex translation is complete, the TUs are in order with the windex equivalents. The TU structural analysis is done based on the Comm ID supplied by the windex. The posits are simply the order of the windexes. The FTU range indicates where the FL breaks are located, so the FL number can be identified as well as the TU Type. Once this is done, then the ST is considered to be normalized. The process by which the FTU is determined is discussed in the Indexer module section, as in the TU type and FL breaks.

Tolerator Module 117

The Tolerator module 117, is an optional module, that expands the search term input by including any synonyms, acronyms, etc., that are in the acceptable range of the individual switches. The output from the Tolerator is then sent to the Posit Block Collector module 118.

The Tolerator module takes as input the output of the Normalizer 115 and populates, if needed, any tolerance data, including all lookups of data stores such as a thesaurus. The number of tolerances supported by search engine varies by implementation and may include: synonym, antonym, homonym, abbreviation, capitalization, punctuation, synonym, frequent misspelling, stemming, boolean, duplicated term, a number, number usage, a formula, and etc. Tolerances that are used in calculating this module occur in the fractional length-level and below functional scope.

This module determines the required expansion of all data points that are impacted by tolerances. Its main output is to indicate the range of acceptable matches by using a set of integers. Tolerance ranges define the scope of the tolerance when used in conjunction with the ST. In some cases, the tolerance will operate only at a specific functional scope, so no indication of range is necessary. With TU- and FL-level tolerances, it is always necessary to identify, in posits, the start and finish of the range for which the tolerance applies.

The posit range is indicated by subtracting the $posit_Y$ from the $posit_X$ (last member in range from $1^{st}$ member in range). If this result is zero, then the TU-level scope applies and the tolerance is treated as a TU-level tolerance. If this result is greater than zero, then the FL-level scope applies and the tolerance is treated as a FL-level tolerance. The Input Interface 105 only needs to describe the range in terms of posits in the ST. The value of the tolerance may be time based, and may occur depending on the individual tolerance, in any FL.

Synonym and other lookup tolerances (e.g. stemming, acronym, etc.) occur at run-time based on the ST, so the output from the Normalizer indicates that a lookup is necessary. The value is changed by the Tolerator so that the level indicated by the lookup is returned for each item in the lookup that is related. Boolean tolerances are done in the RealTime Search component 103 exclusively, since it requires input from the Input Interface. The TUD is checked when the ST=TUD for a given document. The capitalization, punctuation, and other such tolerances are set at Pre-Search for an implementation.

The set of tolerances that are used in the Tolerator are broken down into three functional levels, and these are the constraints in which they operate. Character-based tolerances operate at the character (or letter/symbol in language) and depending on the type of character, the system reacts differently. The tolerances that function in this scope are punctuation, capitalization, wildcard, and other such tolerances. The TU functional scope is simply the TU itself. The FL is a group of TUs that operate together. Therefore, the FL is a superset of TUs. There is usually an associative relation between a TU and a FL in several of the tolerances; in fact, they have the same types of tolerances that operate on them. These include: Boolean, synonym, acronym/abbreviation, TUD, and others. The type of tolerance is based on the functional scope and therefore affects how the grouping value is calculated with the ST array. If a tolerance is to be applied at the FL level, this means that the input string contains the breaks where the tolerance should be applied or a lookup indicates that an FL grouping is necessary for equivalence.

Filter Module 116

The ISet, or searchable universe, is passed through the Filter module 116, which removes any documents with non-compliant attributes from the ISet and passes the remaining ISet members to the Posit Block Collector module 118. Note that this module is optional.

This module removes documents that do not match the document scope variables in the inputer search criteria. Common uses may be to exclude documents that do not have the correct date, are not in a required file format (such as doc), topic, etc. This is a simple comparison, and if the comparison is false the document is eliminated from consideration. Only documents that pass through this module are processed. Another function of the Filter is to communicate with the Cacher 113 for the actual index files that are required to be loaded. If no cacher is used, then the Filter must be able to read index files and perform its necessary operations and outputs. The output of this module is the unique document structure that is sent to the Posit Block Collector 118.

The number of criteria used in the filtering process is based entirely on the number of document scope variables supported by a searchable universe. However, a variable number of document scope variables will be available on a document-by-document basis. Therefore, some documents will not contain a filterable value or values. The handling of this condition is a binary operation, and can be changed to support any implementation. The default is that a no value condition passes that particular filter test. If a document passes all the filters, then it is put into an structure format that is the only information required to perform all RealTime Search operations.

Posit Block Collector 118

The Posit Block Collector 118 determines which of the remaining documents meet threshold requirements. The posit block module eliminates any out-of-bound ISet members by, primarily, determining TU thresholds and creating a full posit block matrix. In addition, the preliminary document threshold (docT) is determined and used to prevent unnecessary processing of documents not meeting the threshold. The output of the Posit Block Collector 118 is a set of integers that indicate the full scope of the acceptable ISet members, and is provided to the Refiner module 119. A matrix may be implemented as a dynamic structure like a linked list or a tree as well as a simple array.

This module performs several functions, namely TU threshold; initial document threshold (docT) determination; and PB builder. One input used by the module is the ST array from the Normalizer 115. Other data is received from the Filter. After initial reception of data from the Filter for a specific SRID, the module must hold all such data until no more documents exist for that SRID. This is necessary to begin initial docT determination (IDD), which comprises three parts, namely create a multipart strata, randomly group the documents in the strata; process each document in the group and afterwards, receive a docT initial value.

The docT initial value is used in the TU threshold, which determines if all the TUs in the ST are in the document; and if they are not, then the document is eliminated. The TU threshold is impacted by tolerance encoding. Therefore, the tolerances set in the Tolerator affect the outcome of this process. The TU blocks from the index are the only data stored from this point on. The remainder of the indexed ISet member is no longer necessary, and the document structure is reformed with only the pertinent parts. The docT score may change over time after the initial docT document set has been processed.

Note that the TU threshold is impacted by tolerance encoding. Therefore, the tolerances set in the Tolerator affect the outcome of this process. The TU blocks from the index are the only data stored from this point on. The remainder of the indexed ISet member is no longer necessary, and the document structure is reformed with only the pertinent parts. If the TU threshold output does not contain enough raw material to meet the docT threshold, then the file is eliminated. The docT is established usually on a random sampling of document before it can be set, if docT is used. Once it is established, the docT initial value is used in the TU threshold, which determines if all the TUs in the ST are in the document; and if they are not, then the document is eliminated. The docT score may change over time after the initial docT document set has been processed.

The following is a list of equations for the docT filtering operations that occur for different search types. These indicate whether or not a document should be processed based on its potential maximum relevance score.

$$\text{If } [(k6)(N107)\Sigma_{(k7)N107}[(k2)(N107)] + (k8)(N107)\Sigma_{(k7)N107}[(k4)(N103)]]$$
divided by $RC_b \geq 1$,
then continue, else stop      Equation 1. b-Fetch DocT Filter.

The above equation is used for b-Fetch type searches. This search is further explained below. It is currently preferable to have k2=1 to 100; k4=1 to 100; k6=25; k7=0.5; and k8=0.034.

$$\text{If } [(k4)(N105)\Sigma_{(k5)N105}[(k2)(N105)]]$$
divided by $RC_e \geq 1$,
then continue, else stop      Equation 2. e-Fetch DocT Filter.

The above equation is used for e-Fetch type searches. This search is further explained below. It is currently preferable to have k2=1 to 100; k4=0.5; and k5=0.5.

$$\text{If } [(k7)(k8)(k2)(N106)(N106)]$$
divided by $RC_f \geq 1$,
then continue, else stop.     Equation 3. f-Fetch DocT Filter.

The above equation is used for f-Fetch type searches. This search is further explained below. It is currently preferable to have k2=1 to 100; k7=0.5; and k8=0.5.

If passed by the docT filter, the document is ready for the PB builder. This refers to the intervals of posits that contain the ST within the constraints as indicated by the TOS. There is an exact correlation in the e-Fetch between the ST and the ISet member required; b-Fetch uses the N101 constraint only; the f-Fetch has several different constraints that are applied. The f-Fetch requires that the constraints for N108, N109, and N110 be calculated during the PB creation. The max length of the PB for the f-Fetch is set based on the size of the ST and the possibility of N110. If N110 is found to possibly be true, then the max size of the PB would be ST*3. If N110 is not found to be possible, then the max size of the PB is ST*2. N108 and N109 therefore affect the size of the PB. If they cause the size of the PB to exceed the maximum size, then the PB is invalid. If all PBs are found to be invalid by this process, the document is eliminated. The TOS is a qualifier, and therefore has no direct constraint effect. The r-Fetch, however, does impact the formation of PBs based on the structure indicated, such as column break or row break.

The PBs should process the tolerances to determine what PB is the strongest case. The general rule is the longer the PB and the more repetitions it contains within the correct TOS constraints, then the better it is. If there is a tie, then the original ST should be used. For instance, the original ST term has the strongest value, unless the BOOLEAN OR is true (in that case, both have the same value). For the synonym and other TU and FL functional-scope tolerances, the tolerated terms are only considered if only tolerated terms are left in the potential PBs. The highest scoring tolerance is then considered the final PB. Only one PB per ISet member length is returned by this module.

The output of this module is the refinement of the document structure such that all the PBs that are required for processing are now stored. All other modules will use the PBs for the remainder of processing.

Refiner Module 119

The Refiner module 119 is used to perform combinatorial search functions, set the ISet length corrector, calculates the docT, and operates as a transfer agent for information passed to the Processor module 120. The ISet length corrector (ILC) normalizes the relevance scorers for ISet universes that contain variation in the number of posits found for an ISet member. The Refiner module 119 also receives information after the Processor module 120, operates on the information, and then passes the refined information to the Aggregator module 121.

The Refiner module receives each document from the Posit Block Collector 118, and performs several functions, namely handling structural elements of a document; passing the document to the Processor; checking the return by running the r-Fetch, if structured; calculating the ISet length corrector (ILC) if required; and calculating the docT.

For structured documents or structured segments, the r-Fetch process must be run to align the PBs so that the Processor receives the correct information; otherwise, the intermediate output of this module is the document's PBs which are sent to the Processor module. Once the document is returned from the Processor, it has an initial relevance score that must be refined under the following conditions. If a document is largely unstructured but contains structured segments, such as a table, then those segments need to be processed afterwards by the r-Fetch to get the final relevance score. All structured documents must be processed by the r-Fetch to get its relevance score.

Depending on the length of the document, the ILC may be required to refine the relevance score to adjust for length discrepancies that affect smaller, yet more relevant, documents. A weighing factor is used to make this adjustment after the Processor provides the initial relevance score. Also, depending on the stage at which the documents have been passed through the Refiner, it may be necessary to calculate an initial docT or recalibrate a current docT if the trigger has been met.

The ILC equation is used when the document's relevance as a whole (not just the MRPs) need to be considered. Since the equations are independent of document size, the ILC is used to introduce the document size as part of the relevance score. Therefore, the ISet size (i.e., the number of posits) is related to the MRP size in posits. The ratio is used to determine this relation MRP posit length/ISet posit length. The closer the ratio approaches one, the larger the increase on the final relevance score. The closer the ratio approaches zero, the larger the decrease on the final relevance score. The ILC equation is expressed as the following:

$$\text{(MRP Posit Length/ISet Posit Length)} * \text{relevance score} = \text{ILC relevance}.$$
Equation 4. ILC Equation.

Hence, all documents are passed through the docT filter based on relevance score only. If the document equals or exceeds the docT score, then the document is sent to the Aggregator module. If it fails, it is removed from processing. On the initial docT filter calculation, the documents may be pruned in the Aggregator, if required by an implementation.

MRPs may also be scored individually and ranked/grouped. The docT may not be used when MRPs only are required.

Processor Module 120

The Processor module 120 communicates to and from the Refiner module 119, and computes the NSet values, relevance scores, and the most relevant parts (MRPs) for the search. After the Processor module 120 completes its functions, its output is sent back to the Refiner module 119.

This module takes as input the PB lengths for a document as assigned by the Refiner, along with the qualifiers to the PBs that are contained within the document structure. Other elements within the document structure are ignored by this module. The Processor calculates the actual determination of relevance of the basic TOS (e.g. f-Fetch, e-Fetch, and b-Fetch) using a set of numbers (NSet). This is completely numeric and is independent of Comm ID, the ST size, or other text that comprise the searchable universe. The NSet is used to calculate the relevance scores and create the MRPs. The output is the relevance score plus the MRPs, in order from strongest to weakest, of each document or structured document or segment. However, the relevance score may be processed on a PB by PB basis and therefore the output is only the score for the PB. This is especially true of structured documents. The Refiner would aggregate these results if document relevance is required.

The NSet is calculated based on the values in the PB, as well as the quality of the PB, based on the TOS value. The NSets represent a set of constraints that are necessary to process the TOS. Each TOS has a unique set of NSets that establish the grammatical/syntactical relations that exist. The tolerated members of the PB are assigned a weighting factor. Any repetitions or even an entire PB may be eliminated if the NSet calculations show that some constraint for that TOS has been violated.

Once the NSets are calculated, then the MRPs can be created. These are also directly derived from the NSet calculations and indicates the largest relevant grouping of repetitions within a section of a document. Based on NSet value, the MRPs can be put in order from strongest to weakest. The number of MRPs that can be returned can vary based on implementation requirements; some implementations may choose not to return MRPs at all.

The final relevance score is determined using the equations for each individual TOS. All relevance is calculated at system runtime, as each relevance score is based entirely on the NSet and MRPs that were found for the document and is calculated on a document-by-document basis. The Processor outputs the relevance score and the MRPs, if required, to the Refiner.

All relevance determinations in the search engine are based on a constraint model. A constraint refers to the length, usually in term units, of a given number set (NSet) member, such as N10x (where "x" is a variable depending on the specific TOS being referenced).

There are three basic types of NSet constraints. The first is the length of the TUs that comprise the ST within an ISet member. This length is variable based on the ST. For instance, the user may be looking for a paragraph in the ISet universe or he may simply be looking for the occurrence of the term unit "dog". The second is the length that comprises the occurrences of the repetition within a grammatically-based limit. The third is the length that comprises the minor-interval-constrained TU occurrences within a grammatically-based difference. Note that other constraints may be used to further refine the ST and/or the ISet member. Each TOS has a set of internal constraints. The Combinatorial searches also have a set of constraints that are independent of the basic TOS. In addition, there are a set of constraints that vary based on implementation, such as the use of acronym callouts or document duplication (either in whole or part). These are referred to as "tolerances" and are a special case of constraints within search engine, see the discussion of the Tolerator 117.

Aggregator Module 121

The Aggregator module 121 collects all the information about one or more ISet members and places the information in a single location for output, including the MRPs, document attributes, ranking, etc. The Aggregator module 121 may be a single-location data store, or may comprise a hierarchical chain of data stores, particularly if multiple instances of search engines or several data stores are operating together on one or more servers. If MRPs need to be translated back into the original language, then MRP decoding may take place in this module. Multiple networks may use separate aggregators to maintain separate indexes and real-time search components and still have a single aggregation point, if necessary, based on user or application needs.

This module usually receives the information from the Refiner on a document-by-document basis, as well as the current docT after a change to the docT has occurred. If only MRPs are required, then each MRP and required characteristics are used. The Aggregator's purpose is collect, as a single-location entity or as a hierarchal chain, all the information about an ISet member and place it in a single location for return to the calling interface along with the MRPs. It then aggregates and sorts the documents, so that they may be processed for the user. The relevance scores may be used to sort documents. The MRPs may also be sorted in this manner if required for an implementation.

Each item (MRP or document) is placed in sorted order based on the relevance score. If there is a tie, then the modified date, alphabetical document address/name, or other criteria may be used. The sort is typically from the most relevant (highest score) to the least relevant or those equal to the docT. When the docT is changed, it is sent to the Aggregator. Any documents that do not meet the docT are eliminated. The documents received by the Aggregator pass the refiner's docT filter at the time the docT had a specific value. If that changes, then the Aggregator should filter the results. After the entire ISet has been processed, and all final documents have been sent to the Aggregator, the sort is complete and the documents are sent to the Returner for final processing.

The optimal return type tolerance is processed by the Aggregator and measures the quality of ST, also known as search differentiation. This allows the user or return system gauge a ST for a specific ISet at locating specific information. If a term is differentiated, it means there is a high variance in the score of each document with respect to the entire index set. If a term is not differentiated, it means there is a low variance in the scoring of each document with respect to the entire index set. The calculation of differentiation done by the return type always depends on the relevance scores. This however, does not measure the actual score, so a high scoring term across the ISet may be poorly differentiated. The return type may be presented in the Returner as a graphic or as a text or not shown at all; in addition, the return type can be used to trigger other searches.

The output of the Aggregator is the return document structure in sorted order, sent as blocks of data to the Returner module 122 for formatting. In some implementations, MRP decoding occurs in this module, see the discussion in the Returner module 122.

Post-Search Component 104

The Post-Search component 104 comprises the Returner module 122, which after receiving the RealTime Search results, puts the information in its final form, such as in a web page. The information in the correct form is then returned to the Return Interface 106.

Post-Search operates when the RealTime Search component 103 has outputted its results and the data now needs to be put into the correct format and returned to the user. This is after the results are known, and the correct format and shipment to the individual user or system needs to be determined and completed. The operations of this component are complete when the user or system successfully receives the results.

Returner Module 122

The Returner module 122 receives the final form of the document structure in order from the Aggregator 121. For each SRID, the return form variable is set. Data is moved into the return form, and not all fields from the document structure need to be used. As soon as the first return screen or other initial interface is formed, it is sent to the Return Interface 106.

The Returner requires the some information in order to correctly write a form, namely an output file format, such as HTML, custom application format, etc. or even raw text, and data points that to be inserted into file format, such a shell HTML file that contains paragraph tags to properly insert MRPs.

Note that the drill down tolerance allows searchers to search within results using any criteria, but retaining enough information about the first search to make the second search effective. There are two basic choices, namely an unrelated drill down with respect to score, or a related drill down with the scores being compared as part of the result processing.

It is possible to either store the original search parameters or to store the original document addresses, in order. This leads to the required parameters that must be processed by the Returner for correct form to send back to the Return Interface since the Returner does not maintain state information. These parameters are the docIDs of all returned documents in order, as well as the relevance scores for each. The basic idea is that a set of documents need to be acted on, so the PBs and other information from the first search is not required, only the docID (address) is necessary to run the Filter module 116 for documents. Documents would need to be read again from the Cacher in some implementations.

Note that MRP decoding may be performed by the Returner or the Aggregator. MRP decoding is a conversion from windex to TU. It requires the matching windex set for each MRP, which is stored as part of the return, and the MRPs. Each MRP is converted by reading the each windex value. All required information for the MRPs, including punctuation and capitalization, if required by an implementation, is returned. Depending on other specialty indexes, such as the findex, which stores formatting information; these may also be called during MRP decoding.

Return Interface 106

Note that in the embodiment shown in FIG. 1, the Return Interface 106 is not part of the Post-Search component 104, but is discussed here for illustrative purposes. Other embodiments may have the functions of the Return Interface 106 internal to the Post-Search component 104 or combined with the Returner module 122.

Figure 8:
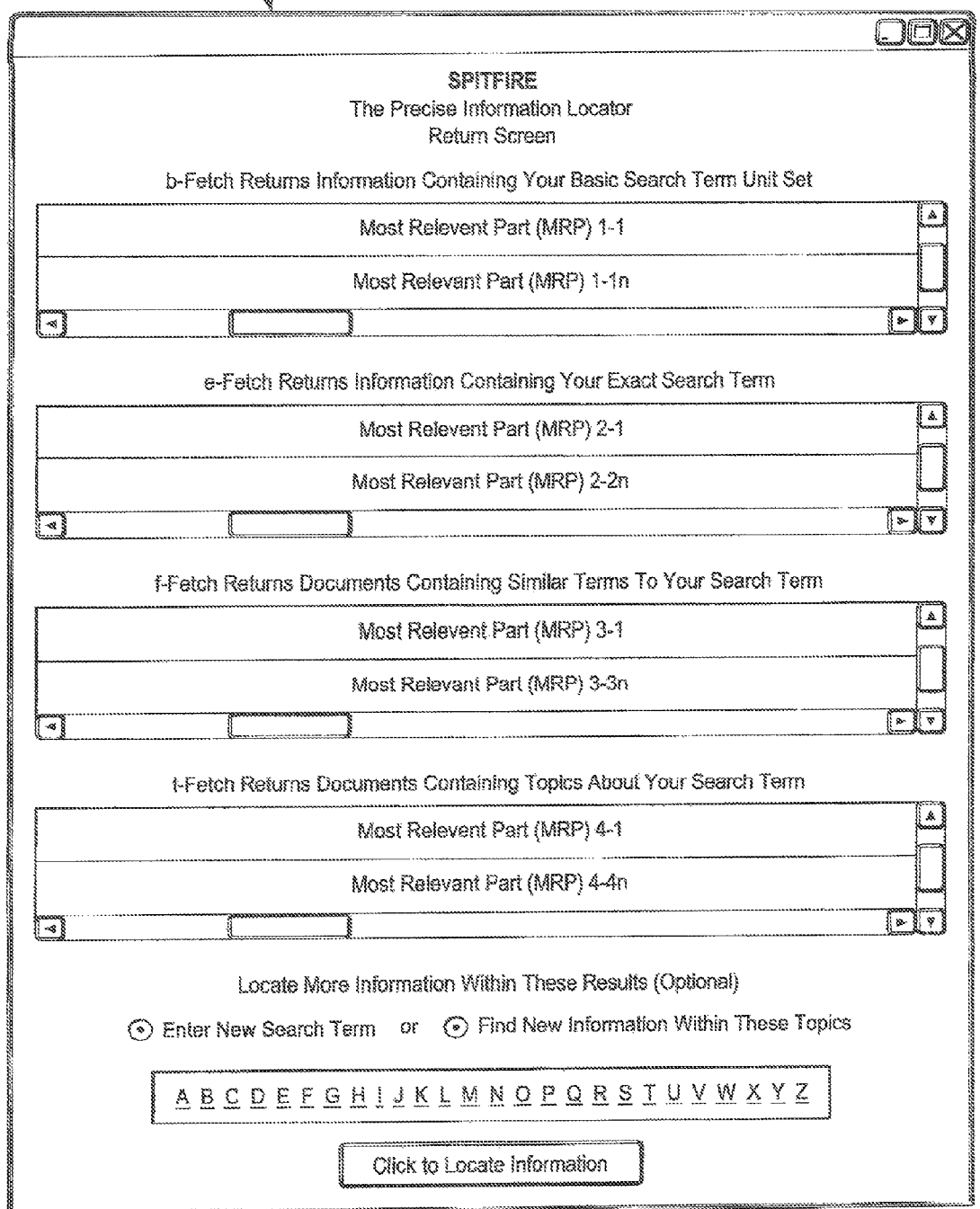
FIG. 8 depicts an example of an output interface, according to embodiments of the invention.

The function of the Return Interface is to provide a way for the user to observe the results of the operation of the search engine for a desired search term. As with the Input Interface, specific interface designs are subject to the needs of a given implementation. For illustration purposes, FIG. 8 depicts an example of a Return Interface 106 showing the MRPs for each ISet member that meets the search criteria. Note that the interface may be a GUI. FIG. 8 also depicts the options of performing a sub-topic search based on the information contained in the discovered ISet member's MRPs or entering a new search term.

Searching

The main focus of the search engine is the search intersection of the search terms and the ISet members. The following equation describes the basic search function, represented as an intersection:

$$ST \cap ISet|_1^n \qquad \text{Equation 5. Basic search.}$$

This equation reflects that searching is a binary operation. The first term of this equation is the search term or ST, which is the user-entered string (i.e., search set). The second term is the ISet, which is the set of terms that comprise the range ("n") of the search universe that is assessable to the user, and where the required scope of the search based on user input is determined. An ISet member is a single instance of a document or other source in the searchable universe. The intersection of the ST and ISet represents the results of the search, namely documents that contain the search terms or variants thereof.

There are several types of search (TOSs) that can be performed on the search engine. A user can condition the STs with respect to a desired level of grammatical and/or syntactical usage. As described herein, there are three types of basis searches and there are two types of combinational searches. However, the search engine may be configured to operate with other types of searches.

Basic Searches

There are three basic types of searches, namely a Bucket Fetch or b-Fetch, an Exact Fetch or e-Fetch, and a Flex Fetch or f-Fetch. A basic TOS is an expression of the intersection between the ST and ISet member at its most fundamental level. The intersection has a grammatical or syntactical element, that is reflected in how the constraints, intervals, and relevance equations are derived. Even if the ST's grammatical/syntactical value is not required to count a repetition of the ST, it is used to refine the posit block array (PB) intervals, and the strength of the ISet Member in the relevance equation.

Bucket Fetch

A Bucket Fetch or b-Fetch TOS, is the end-user request for the retrieval of all searchable documents containing the ST in whole, in any TU order, or in any TU position. The search term may contain one or more TUs to an unlimited number of TUs. The search engine returns only those documents containing at least one appearance of each TU or those that meet the required docT, in a form where they may be in exactly the same TU order and TU position as in the original ST or they may be in any TU order or TU position relative to the original ST. Note that a Bucket Fetch has no constraints associated with it.

For example, consider the search terms ST="dog went store". Each ISet member must contain all the TUs comprising the ST regardless of TU order or TU position to be considered possibly relevant. Thus, a document containing "The store manager keeps a dog on guard at night after a burglar went into the store" is an example of an acceptable return for a Bucket Fetch.

Equation 6 defines the b-Fetch relevance score associated with each returned ISet members. Note that RC is relevance equation.

$$RC_b = k1(N101)\Sigma_{N101}(k2(N102)) + k3(N101)\Sigma_{N101}(k4(N103)) + k5(N104)\Sigma_{N104}\{\Sigma_{N101}[k2(N102)(N105)] + k3(k4)(N106) + k2[N107-(N101)(N102)]\} \qquad \text{Equation 6. b-Fetch.}$$

The following table describes the constraints (k) in b-Fetch Equation 6.

TABLE 1

Constraints in b-Fetch Equation 6.

| | |
|---|---|
| k1 | Function that varies with occurrence of N101 TUs |
| k2 | Function dependent on ST tolerance |
| k3 | Numeric constant based on N101 and N103 minor interval constrained TUs |
| k4 | Function dependent on Fractional Length and TU layers |
| k5 | Function that varies with occurrence of N101, N102, and N105 TUs and TU sets |

It is currently preferable to have k1=5; k2=1 to 100; k3=0.067, k4=1 to 100 and k5=a minimum of 2.

The following table describes the terms used in b-Fetch Equation 6.

TABLE 2

Terms in b-Fetch Equation 6.

| | |
|---|---|
| N101 | Number of minor-interval constrained TUs within ISetM length |
| N102 | Number of TU sets within minor ISetM intervals |
| N103 | Number of non-constrained TUs within minor ISetM intervals |
| N104 | Number of major-interval constrained TUs within ISetM length |
| N105 | Number of minor interval constrained TUs within major ISetM intervals |
| N106 | Number of non-constrained TUs within ISetM length |
| N107 | Number of TU sets within ISetM length |
| | ISetM = ISet Member |

Exact Fetch

An Exact Fetch or e-Fetch TOS is the end-user request for the retrieval of all searchable documents containing the ST precisely as entered, including ST TU order and ST TU position. An Exact Fetch TOS is used to locate a precise match of the ST in the searchable ISet. It may contain from two to an unlimited number of TUs. The search engine will returns those documents containing the precise ST, meaning whose content and functional words are in the precise TU order and precise TU position as in the original ST.

For example, consider the search term ST="the dog went to the store". Each ISet member must contain exactly this term in this exact TU order and TU position to be considered possibly relevant.

Equation 7 defines the e-Fetch relevance score associated with each returned ISet member.

$$RC_e = k1(N101)\Sigma_{N101}(k2(N102)) + k3(N103)\Sigma_{N103}\{\Sigma_{N101}[k2(N102)(N104)] + k2[N105-(N101)(N102)]\} \quad \text{Equation 7. e-Fetch}$$

The following table describes the constraints (k) in e-Fetch Equation 7.

TABLE 3

Constraints in e-Fetch Equation 7.

| | |
|---|---|
| k1 | Function that varies with occurrence of N101 TUs |
| k2 | Function dependent on ST tolerance |
| k3 | Function that varies with occurrence of N101, N102, and N104 TUs and TU sets |

It is currently preferable to have k1=2; k2=1 to 100; k3=a minimum of 2.

The following table describes the terms in e-Fetch Equation 7.

TABLE 4

Terms in e-Fetch Equation 7.

| | |
|---|---|
| N101 | Number of minor-interval constrained TUs within ISetM length |
| N102 | Number of TU sets within minor ISetM intervals |
| N103 | Number of major-interval constrained TUs within ISetM length |
| N104 | Number of minor interval constrained TUs within major ISetM intervals |
| N105 | Number of TU sets within ISetM length |
| | ISetM = ISet Member |

Flex Fetch

A Flex Fetch or f-Fetch is the end-user request for the retrieval of all searchable documents containing the ST within a range of TUs that include either 1) ST constrained TU-position interruption and/or 2) constrained ST TU-order inversion. These constraints involve ST augmentation by either one or more other content TUs (CTUs) and/or functional TUs (FTUs), both within and external to the ST.

For example, consider the search terms comprising the phrase "small engines" and the search returns "small gasoline engines", "small diesel engines", "small economical engines", "engines that are small", etc. "Engines" may be modified by insertions such as "gasoline" and "economical", but does not contain nongrammatical or syntactical number of them. Note that insertions become nongrammatical based on number when they exceed the number of terms in an ST, thereby not representing a relation. The use of inversion is also correctly constrained, and thus each of the returns preserves the integrity of the ST. Furthermore, the output always contains all the CTUs of the ST, although it may contain other TU(s) within its first and last terms (i.e., between "small" and "engines"), or it may be separated into two or more relevant parts, only if inversion is true.

As another example, consider the search terms ST="the dog went to the store". Each ISet member must contain these terms, either as stated or as in "the dog went into the store" or "the dog Cody went into the department store" for the ISet member to possibly be relevant. The order and position may change, but are constrained by the rules of the grammar and/or syntax of the language to prevent nongrammatical variations from occurring. Another example illustrates this. Consider the search terms ST="blue jacket". Each of the following ISet member extract would be considered nearly equivalent or equivalent: blue jacket; blue denim jacket; jacket in blue. In each case, no grammatical rules were violated. Note that a search engine user would not have to specify any closeness between term units nor any other conditions. This would be handled by the search engine by its grammar-embedded functions.

As shown by the above examples, the search term should contains at least one CTU and may contain two or more CTUs, and/or it may contain one or more FTUs. All CTU members of a search term are considered "keywords" (KWs) for the purpose of searching. In most languages, including English, a TU is any set of characters (e.g., words) or symbols separated by a space.

An insertion is when a PB contains one or more other FTUs or CTUs both within and external to the ST. The insertions are restricted to a set of grammatical or syntactical constraints, as well as the size of the ST. These are always determined at runtime, so no set values are required as either part of the input. Inversion is described as the change in FL whereby the last KW of the FL occurs in the previous FL. This means that if the ST contains only one FL originally, the ISet member would have two FL. For example, ST="the Siberian husky", and the inversion is "the husky of Siberian ..."=ISet member.

Note that the TU "husky" occurs in the previous FL and the remaining TU (in this case, just Siberian) occur in the next FL.

Equation 8 defines the f-Fetch relevance score associated with each returned ISet member.

$$RC_f=(N101)(N102)\Sigma_{N101}(N103)+ \\ k1(N102)(N104)\Sigma_{N104}\{\Sigma_{N101}[(N105)(N103)]\}+ \\ k2[N105-(N101)(N102)]$$

where $N103=\Sigma_{N107}(k3/N107)[(k2)(N107)-(k4)(N108)-(k5)(N109)-(k6)(N110)]$  Equation 8. f-Fetch.

The following table describes the constraints (k) values of f-Fetch Equation 8.

TABLE 5

Constraints in f-Fetch Equation 8.

| | |
|---|---|
| k1 | Function that varies w/occurrence of N101 TUs |
| k2 | Function dependent on ST tolerance |
| k3 | Function that varies with occurrence of N101, N102, and N104 TUs and TU sets |
| k4 | Function that varies with occurrence of N108 |
| k5 | Function that varies with occurrence of N109 |
| k6 | Function that varies with occurrence of N110 |

It is currently preferable to have k1=2; k2=1 to 100; k3=a minimum of 2, k4=0.25, k5=0.50, and k6=0.75.

The following table describes the terms used in f-Fetch Equation 8.

TABLE 6

Terms in f-Fetch Equation 8.

| | |
|---|---|
| N101 | Number of minor-interval constrained TUs within ISetM length |
| N102 | Number of TU sets within minor ISetM intervals |
| N103 | Number of net fractional interval constrained TUs within ISetM length |
| N104 | Number of major-interval constrained TUs within ISetM length |
| N105 | Number of minor interval constrained TUs within major ISetM intervals |
| N106 | Number of TU sets within ISetM length |
| N108 | Number of fractional interval constrained non-ST-split TUs |
| N109 | Number of fractional interval constrained ST split TUs |
| N110 | Number of fractional interval constrained inverted TUs |
| | ISetM = ISet Member |

Combinatorial Searches

There are two types of combinatorial searches, namely a Record Fetch or r-Fetch, and a Topical Fetch or t-Fetch. These searches add information that is necessary to process an SR that is outside the scope of the ST. In general, these searches condition the ISet members so that the SR can be properly processed. Note that other combinational searches may be performed with the search engine, such as a Query Fetch or q-fetch, and a Multi-Media Fetch or m-Fetch.

Record Fetch

A Record Fetch or r-Fetch is a request to analyze structured documents or segments of documents that are structured. A structure in this context refers to the grouping of words, either by a column definition (as in a database), or in a columnar or row fashion with a loose (unenforced) relation (as in a word processing table). Such delineations in the text mean that the grammatical relations are bounded not by the inherent grammar but by the length of a column or row. In an unstructured document, no such restriction exists. An unstructured document has no inherent relations indicated by any form, so the document is only analyzed for its grammatical and/or syntactical attributes using the basic TOSs. The r-Fetch restricts the basic TOSs and constrains them to run within the correct lengths as indicated by such a structure. The r-fetch is also used to rank both structured, unstructured documents with structured segments, and unstructured documents so that both can be properly compared.

Equation 9 defines the r-Fetch relevance score associated with each returned ISet member.

$$RC_r=\Sigma_{N101}+k1\Sigma_{N102}[\Sigma_{N103}]+k2\Sigma_{N102}[\Sigma_{N104}]- \\ k3\Sigma_{N102}[\Sigma_{N105}]-k4\Sigma_{N102}[\Sigma_{N106}]$$  Equation 9. r-Fetch The following table describes the constraints (k) values in r-Fetch Equation 9.

TABLE 7

Constraints in r-Fetch Equation 9.

| | |
|---|---|
| k1 | Function that varies with occurrence of MRPs |
| k2 | Function that varies with occurrence of N104 |
| k3 | Function that varies with occurrence of N105 |
| k4 | Function that varies with occurrence of N106 |

It is currently preferable to have k1=a minimum of 1; k2=0.75; k3=0.25, and k4=0.50.

The following table describes the terms in r-Fetch Equation 9.

TABLE 8

Terms in r-Fetch Equation 9.

| | |
|---|---|
| N101 | $RC_{bef}$ Score |
| N102 | Number of PBs in the ISetM or ISet member Length |
| N103 | Number of MRPs in the $j^{th}$ PB |
| N104 | Number of Primary keys in the $i^{th}$ MRP of the $j^{th}$ PB |
| N105 | Number of Foreign keys in the $i^{th}$ MRP of the $j^{th}$ PB |
| N106 | Number of Group keys in the $i^{th}$ MRP of the $j^{th}$ PB |
| | ISetM = ISet Member |

Topical Fetch

Topical Fetch is a combinatorial-discovery type of search that assigns topics to sections or entire ISet members. At the beginning, the topical fetch functions at the ISet member level, and therefore a set of functions is performed on the document before any combination is possible for a higher scope. First, all windex values for the document are analyzed to determine if they can pass the topical filter, which removes noise TUs from the windex values of the document. The topical filter contains the entire set of FTUs for a specific Comm ID as well as a set of CTUs. A sample list of such CTUs are listed below; these are also affected by the potential data store used by as well as requirements for a specific implementation as well.

TABLE 9

Sample List of Noise TUs.

| | | | | | |
|---|---|---|---|---|---|
| All | Has | It | ought | then | whoever |
| Am | Have | its | ours | they | whomever |
| Are | Having | meanwhile | shall | thus | whosoever |
| Be | He | more | she | throughout | would |
| Been | Hers | much | should | till | you |
| Both | Him | must | such | was | yours |
| Could | How | none | than | were | |
| Did | If | not | therefore | whatsoever | |
| Does | inasmuch | other | theirs | when | |
| Had | Is | others | them | whichever | |

Once the noise TUs are filtered out, then a frequency analysis may be run with the remaining windex values to determine the most used TUs in the document. Note that this frequency analysis is optional. There are several ways to run frequency tests based on mathematics. The output varies based on the size of the document and the range of topics present in a document. After filtering the noise TUs and a frequency reduction, if implemented, the output is the set of single-TU potential topics.

Note that if any tolerances are used by an implementation, they are usually incorporated at the beginning. For instance, if a synonym or stemming tolerance is used with the Topical Searcher, then it is necessary to group such terms with their parent single-TU topic. This is usually done by the use of a data store such as a thesaurus or a project dictionary, which is used to find the terms that are considered to be near the TU, and stored accordingly as a part of the windex value set to be used for the remainder of the analysis.

The potential topics and their associated posits must be collected. This information is used to calculate the initial TIs that are possible with the single-TU topics. The TI formation is based on Comm ID, and uses the following process. Each instance of a potential topic is measured in posits from one another to form a topic cluster (TCL). A TCL has, in English, between 80 to 350 posits between its end points, based on Comm ID. The TCL can grow so long as each instance is inside this constraint. If a TCL is closed, then it is possible a topic cluster group (TCG) can be formed, so long as there is another TCL as the TCG's endpoint. Thus, a TCG requires tow TCLs as endpoints in order for its formation. The TCG interval between two clusters is a multiple, in English, between 2 and 5 of the TCL, again based on Comm ID. A TI is either a TCL or TCG, depending on the maximum length possible. Note that the entire set of posits for a specific windex may form one or more TIs based on the constraints imposed above.

Once the TIs are formed, then they are overlapped to determine the basic posit relations that exist. An overlap is a binary operation that refers to the relation between a TI and a neighbor, e.g. its immediate successor, based on the starting posit for each TI. The overlap condition occurs when the two TIs have posits in common. In other words, the TIs are sorted based on the beginning posit from smallest to largest with respect to their order of appearance inside the document. Overlaps also serve a constraints, where an overlap ends when two consecutive TIs do not share any posits in common. The endpoints of an overlap are the beginning posit of the first TI in the overlap and the ending posit of the last TI.

With the overlaps calculated, the multiple-TU topic determination occurs. It starts by establishing the maximum length of a topic for a Comm ID. Then, there are modified constraints based on the f-Fetch TOS that are used to establish the maximum length of a frame. A frame refers to the total number of posits in order that are examined for the multiple-TU topic. A frame's endpoints can be compared to the number of single-TU topics that occur within the frame, subject to the constraint that, if no inversion is true (e.g. all remain in the same FL), the number of insertions cannot exceed four times the number of single-TU topics. This is expressed by: (4) (single-TU topics/frame). If the no inversion condition holds true, then the starting and ending posits must be checked to make sure that the maximum length is not violated. An inversion occurs when there are two adjacent FLs, where the first adjacent FL contains a single-TU topic and the second adjacent FL contains at least one single-TU topic, subject to the multiple-TU constraints. There may be other rules associated with this, depending on the Comm ID. In English, the use of FTUs is a requirement for an inversion. If an inversion condition is true, the maximum number of insertions cannot exceed 50% of the number used for noninverted topics. Note that noninversions are more restrictive than inversions. This scalar is then multiplied by the number of single-TU topics within the frame, expressed by: (scalar) (single-TU topics/$frame_1$)+(scalar) (single-TU topics/$frame_2$). If the inversion condition holds true, then the starting posit in frame 1 and the ending posit in frame 2 must be checked to make sure that the maximum length is not violated.

The resulting frame contains the multiple-TU topic, subject to any tolerances. Each frame that can be formed by the single-TU topics must be analyzed so that the total set of multiple-TU topics can be found. It is possible that no multiple-TU topics will exist. However, if tolerances are used, then it is necessary to be able to determine if a tolerated TU is related to a single-TU topic, and adjust the frame accordingly or remove the frame if only one TU remains in the frame. Such tolerances will operate on the overlap determined by the single-TU topic constraint. After a frame has been analyzed for both length, constraints involving insertions and inversions, and tolerances, then the frame can be considered a multiple-TU potential topic.

Once this set is established, it is usually necessary to run a set of refinements called Multiple-TU Commonality. This is usually necessary to remove spurious expressions of a multiple-TU topic that do not occur within length or frequency conditions, such as the TCL boundaries. Multiple-TU potential topics are examined by using their common characteristics, namely the number of TUs within the multiple-TU topic, the frequency within an overlap or a document constraint, and the position of repetitive elements. A repetitive element occurs when in a binary comparison, most or all but one of the TUs are in the same order and in the same position in both multiple-TU topics. For example: if xyz is equal to multiple-TU topic 1 and xya is equal to multiple TU topic 2, then the repetitive elements are the subset (xy).

A variety of tests based on these combinations can be done, which can be tailored for a variety of implementations. The basic tests are as follows. Comparisons of the smallest possible multiple-TU topic for the Comm ID for repetitive elements in more than one multiple-TU topics. Next, comparisons using the generic form AB to ABC, where the repetitive elements comprise all the TUs in the first term and all but one in the second term. Also there are comparisons using the form AB to AC to ABC, where the repetitive element is the starting term, and the ending terms all occur in the last, larger set (ABC). Lastly, the pivot test takes the form CAB to CA to AB, where A is the pivot that links the smaller sets (CA, AB) with (CAB), which is greater in size (number of TUs). There are significant variations to these basic tests. In general, tests should be run from the smallest set comparisons (number of TUs=2) to the largest set comparisons (maximum number allowed).

An optional modifier reduction may be necessary in some implementations. A modifier is a TU that cannot, for a given Comm ID, be a single-TU topic by itself or terminate a multiple-TU topic. Some examples in English are: bigger, additional, steamed, westerly, and reducing. These may be removed from any potential single- or multiple-TU topics remaining, if required by an implementation.

When a multiple-TU topic set has been established, it is necessary then to remove it from the single-TU topic TIs any occurrences that form multiple-TU topics. This will require an adjustment of the single-TU topic TI, especially if the multiple-TU topic exists as an endpoint. Also, since it is an independent operation, the multiple-TU topics must have their TIs calculated. Note that any single or orphans of a single- or multiple-TU topic cannot form a TI. Once all such TIs are calculated, then the density of the TI can be determined by a simple count of the number of instances that form the TI.

Afterwards, the overlap is determined for the TIs that are the final set of topics for the document. The overlap works the same way as before, with the starting posit of each TI used to determine the order within the document, and each successive TI checked to see if any posits are found to be in common. The final output is the final overlap values that exist for the document. There is not limit to the number of overlaps that can occur within a document. If any tolerances are used such as synonyms or stemming in an implementation, then a group assignment is necessary for each overlap that has been found. This indicates the set of values that are related to the final TIs for that overlap or section of the document.

Once this has been done, then the topics can be placed in a standard outline form using any standard lexicographic method known in the art, if required by an implementation. Such topical information may also be written to the index file as part of the ISet-Member scope variable section or assigned to corresponding posit values. This would contain the overlap constraint, each TI's endpoints along with its corresponding windex values (i.e., its topic identifier) under that constraint, and the tolerance group values that relate to the overlap constraint, if required by an implementation.

EXAMPLE

The following example is used to show how the search engine, according to embodiments of the invention, operates to index a short document and then finds a search term (ST) in the document using the index.

Short Document names "test" and is comprised of the text of "The quick brown fox jumped over a lazy dog. The fox then ran away."

The search engine begins by acquiring the document is acquired by the system. English is the language of the document. A parse is done to locate the TUs by using the TU separator of the language; in this case, a space. The resulting strings are further broken down to remove external punctuation, creating an initial matrix.

Matrix 1

| The |
| Quick |
| Brown |
| Fox |
| Jumped |
| Over |
| a |
| Lazy |
| Dog |
| . |
| The |
| Fox |
| Then |
| Ran |
| Away |
| . |

The initial matrix is converted into a windex form, whereby the TU are replaced with a numeric code using the FTU matrix along with punctuation supported by the ASCII character set. Assume this is the first document being indexed by the search engine, and that the CTU values start at 120. Matrix 1 is thusly converted into matrix 2.

Matrix 2

| 61 |
| 120 |
| 121 |
| 122 |
| 123 |
| 52 |
| 1 |
| 124 |
| 125 |
| 87 |
| 61 |
| 122 |
| 126 |
| 127 |
| 128 |
| 87 |

From this basic encoded matrix, an ST can be entered by a user and processed by the invention. The storage of this on disk can vary based on implementation. In this simple example, Matrix 3 shows a preferred arrangement of the index format, including any ISet member variables such as document name. In this case, the document name="test". There are two basic blocks that are illustrated, namely an ISet block and a windex or TU block. The string "test" is the ISet block member. The windex block begins with the first occurrence of the first TU in windex order, and underneath each windex number contains all the posit numbers for that windex number (a space indicates the end of the individual windex block in the matrix). Implementation specific items such as length counters have not been included so as to make the index more readable.

Matrix 3

| Test |
| |
| 1 |
| 7 |
| |
| 52 |
| 6 |
| |
| 61 |
| 1 |
| 11 |
| |

| 87 |
|----|
| 10 |
| 16 |

| 120 |
|-----|
| 2 |

| 121 |
|-----|
| 3 |

| 122 |
|-----|
| 4 |
| 12 |

| 123 |
|-----|
| 5 |

| 124 |
|-----|
| 8 |

| 125 |
|-----|
| 9 |

| 126 |
|-----|
| 13 |

| 127 |
|-----|
| 14 |

| 128 |
|-----|
| 15 |

Matrix 3 contains all the information in a storage mode. The ISet member variable is stored as a string for this example; however, it may be encoded using a technique similar to the windex.

At this point, the basic information needed to conduct searches is available. For this example, assume that a user enters the search term "fox". This is a single-TU entry, and the b-Fetch is automatically chosen because of the size of the ST.

The ST is converted into the same format as matrix 3; in this case, that means that a windex value must be assigned to "fox". That value, as seen from matrix 3 is equal to 122.

The windex value 122 is compared to each document to determine its location. For a b-Fetch, the existence of the value is sufficient, without any other constraint, to be a potential document that is returned. In this example, only one document is in the searchable universe. The comparison takes place by using a modified binary search to locate the windex value within the TU block. The windex value is found in this document, and what is returned is the part of the document containing this windex value, as well as any other TUs as required by an implementation.

The value 122 is found, and that indicates that the first test, the TU threshold test, has passed. We will assume at this point that the document threshold is equal to 1 for the remainder of this example. Next, we need to construct a frame of 24 posits. The frame starts on the first KW. This is done to determine the full extent of the PB matrix. In this example, there are two occurrences of 122 in the frame of 24. Since the document is less than the frame size, only one frame is possible for the document. All the windex values from posit 4 to 12 are included in this frame since two KWs occurred. Again, for this example, all other TUs that may be used to make up an MRP for clarity have been eliminated. Again, the space indicates the break within the ISet member and windex blocks. In this case, the following matrix is returned.

Matrix 4

| Test |
|------|

| 1 |
|---|
| 7 |

| 52 |
|----|
| 6 |

| 87 |
|----|
| 10 |

| 122 |
|-----|
| 4 |
| 12 |

| 123 |
|-----|
| 5 |

| 124 |
|-----|
| 8 |

| 125 |
|-----|
| 9 |

Once this has been done, the number of KWs found is recorded as two. There are no orphans in this example as the ST=1. There is therefore only one PB returned for this example. The PB starts at posit 4 and ends at posit 12.

Since there is only one PB, and since no refinements or tolerances are required in this simple example, the Processor can now process the equation. First, the PB indicates that there are two KWs. Since the ST=1, this means that the number of KWs=the number of N101s.

Next, the N103 number is true because there are at least two KWs and they occur within a single PB of less than or equal to 24. Since there are two N101s that occur within the N103, there are two N102s.

No other constraints are required, so the relevance equation can then be processed. k2=1 since no tolerances are required so no adjustment in score is required.

$$Rcb=[(k1)(2)][(k2)(2)]+0+0+0$$

$$Rcb=[(5)(2)][(1)(2)]=20$$

Thus, the relevance score for this document is 20. If other documents were available and matched, then this document would be ranked accordingly. The document and its relevance is then returned to the user.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor-readable medium. The "processor-readable medium" may include any medium that can store or transfer information. Examples of the processor-readable medium include an electronic circuit, a semiconductor memory device, a ROM, a flash memory, an erasable ROM (EROM), a floppy diskette, a compact disk CD-ROM, an optical dish, a hard disk, a fiber optic medium, etc. The code segments may be downloaded via computer networks such as the Internet, Intranet, etc.

Figure 9:
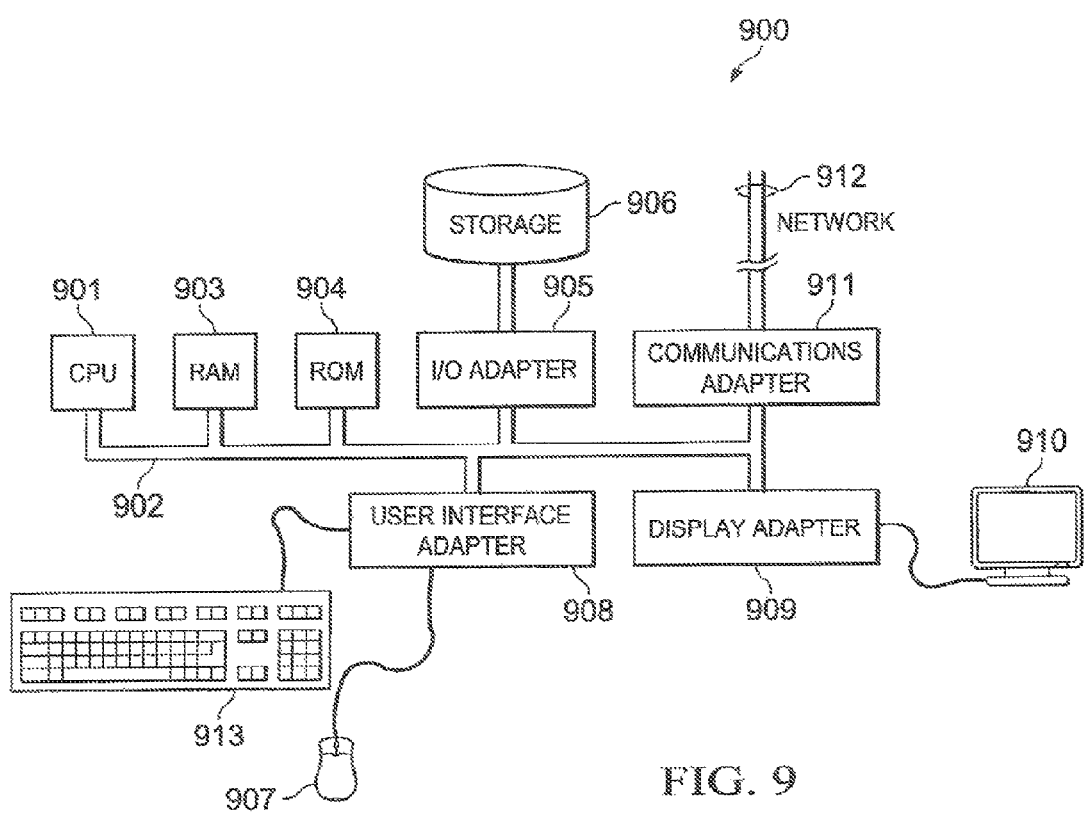
FIG. 9 depicts a block diagram of a computer system which is adapted to use the present invention.

FIG. 9 illustrates Computer System 900 adapted to use the present invention. Central Processing Unit (CPU) 901 is coupled to System Bus 902. The CPU 901 may be any general purpose CPU, such as an Intel Pentium processor. However, the present invention is not restricted by the architecture of CPU 901 as long as CPU 901 supports the inventive operations as described herein. Bus 902 if coupled to Random Access Memory (RAM) 903, which may be SRAM, DRAM, or SDRAM. ROM 904 is also coupled to System Bus 902, which may be PROM, EPROM, or EEPROM. RAM 903 and ROM 904 hold user and system data and programs as is well known in the art.

System Bus 902 is also coupled to input/output (I/O) Controller Card 905, Communications Adapter Card 911, User Interface Card 908, and Display Card 909. The I/O Adapter Card 905 connects to Storage Devices 906, such as one or more of a hard drive, a CD drive, a floppy disk drive, a tape drive, to the computer system. The I/O Adapter 905 is also connected to Printer 914, which would allow the system to print paper copies of information such as document, photographs, articles, etc. Note that the printer may be a printer (e.g. inkjet, laser, etc.), a fax machine, or a copier machine. Communications Card 911 is adapted to couple the Computer System 900 to a Network 912, which may be one or more of a telephone network, a local (LAN) and/or a wide-area (WAN) network, an Ethernet network, and/or the Internet network. User Interface Card 908 couples user input devices, such as Keyboard 913, Pointing Device 907, and Microphone 916, to the Computer System 900. User Interface Card 908 also provides sound output to a user via Speaker(s) 915. The Display Card 909 is driven by CPU 901 to control the display on Display Device 910.

Note that the following glossary is intended to assist the reader in understanding the material described herein. The glossary is to supplement to definitions, explanations, and meanings provided herein, and is not to replace or otherwise limit in any manner the terms used herein.

GLOSSARY

| Term | Definition |
| --- | --- |
| ACL | Access Control List used by network operating systems to control access to share points and files. |
| Bucket Fetch (b-Fetch) | A Basic Type of Search request used to find the Search Term, comprising of 1 or more term unit(s), in a set of documents regardless of term unit order or term unit position. |
| Communications | "Communications" refers to all manner of information transfer, including but not limited to client-server, web-based and other systems. This is without regard to the media (if any is required) for the information to be transferred. |
| Communications ID (Comm ID) | Identifies the grammar or syntax used at the time of indexing, and it uses a set of FTUs to be identified and stored. English is the default language. |
| Computer | "Computer" refers to any entity that can process a sequence of instructions, this is not limited to conventional computing where switching devices are used at the lowest level. This includes all manner of digital and analog computing, including optical, quantum, nanotech, fluidic, pneumatic or other decision-making devices or systems. |
| Constraint | Result of a formation of an interval that cannot exceed boundaries as set at runtime. |
| Content TU (CTU) | A TU that has a unique meaning(s). |
| DLen | Document Length. |
| Data Storage Device | "Data Storage Device" . . . Storage refers to any system capable of storing and retrieving information, including but not limited to all forms of magnetic, charge-storage, quantum well, and optical storage. |
| Document | Textual or database (e.g., table or array) information set; see ISet Member. |
| Dual Document | An unstructured document that contains structured segments, e.g., an embedded table or database. |
| Exact Fetch (e-Fetch) | A Basic Type of Search request used to find the Search Term, comprising of 2 or more term units, exactly as listed in the Search Term, without any change to their term unit order or term unit position. |
| Findex | Operates at the TU, phrase, or section scope. It efficiently encodes specific information about formatting that is common throughout multiple ISet member instances (such as bold, underline, font, border), making the storage of such information more distributable. |
| Flex Fetch (f-Fetch) | A Basic Type of Search request used to find the Search Term within a range of term units that include either ST constrained term unit-position interruption or constrained ST term unit-order inversion. |
| Fraction | A fraction is either a) a series of CTUs or b) contains an FTU or FTU series then a single CTU or a series of CTUs; it does not correspond to an English FL in definition. |

-continued

| GLOSSARY | |
|---|---|
| Term | Definition |
| Fractional Length (FL) | The number of posits that occur starting w/an FTU or first posit of an ISet and ending w/the last CTU that occurs directly before an FTU or the last posit of an ISet member. |
| Fractional Length (FL) Layer | The functional level constrained by an FL instance. |
| Frequency | The number of times a ST TU, FL, or entire set appears in the ISet Member. |
| Functional Scope | The level at which a function operates on a range of data. |
| Functional TU (FTU) | A TU that contains no unique meaning, but provides some type of information about another TU, usually a content TU. |
| Group | A portion of the SU that is grouped using some kind of mechanism or filter, such as a set of documents that have the same file type or are exist at the same network location. |
| Group Layer | The functional level for group. |
| Index | The index is the overall store of ISet Universe information at potentially all operating scopes, depending on implementation, in a searchable format that is efficient and distributable. It include any number of supporting encoding schemes (such as Windex, Pindex, etc.). This is itself a file format that can be used by any application. |
| Indexing | Process of creating a usable set of data required for all search functions, and may be used to replace original document. |
| Information Category | The highest level of a topic that occurs with an ISet Member, group, or universe. |
| ISet | Information Set representing the searchable documents that meet the search region and file filter restrictions for a search (see "search region"). |
| ISet Length Corrector (ILC) | The process that normalizes relevance scores for documents of varying lengths (DLens). |
| ISet Member (ISetM) | A single subset of an ISet. |
| ISet Member (ISetM) Layer | The functional level that processes data for the entire ISet Member instance. |
| ISet Universe | All documents that constitute the total searchable documents in an information repository (e.g., data store). |
| Most Relevant Part (MRP) | ISet segment(s) containing the ST within the actual MRP excerpt length. |
| MRP Decoder | Process that translates the numeric MRP values to the original term units. |
| Order | The occurrence of a set of TUs from left to right (as in English), either in a search term or in a document. |
| Pindex | An efficient encoding scheme that stores path and other file location information in a form that is distributable, and operates at various scopes. |
| Posit | The sequentially-numbered position (i.e., integer) assigned to each indexable TU, within an ISet member. |
| Posit Block (PB) | A grouping of posits that contain one or more repetitions of an ST; they vary in length based on runtime results. They may contain other TUs that are not part of the ST but occur within constraints between the STs that are found. |
| Posit Block (PB) Layer | The functional level where processing occurs within a PB instance. |
| Record Fetch (r-Fetch) | A Combinatorial Type of Search request used to find the Search Term within a range of term units in structured documents or segments of documents that are structured. In this context, structure refers to a group of TUs, either by enforced column definition (as in a database), or in a columnar row fashion with a loose (unenforced) relation (as in a word processing table). |
| Relevance | The score given to each ISet Member that indicates how close its content matched the search request. The score may be used to sort the search results for the user. |
| Search Region | The range of addresses that comprise a region; this is identified by a unique integer. For instance, a company can set a file server as a region, identified as 233, another server as 235. This way, the specific region that the user is either restricted to or requires can be identified. |
| Search Request (SR) | The search term and search criteria |
| Search Request ID (SRID) | The unique identifier for a request so it may be tracked or so all related processing may be grouped. |
| Search Term (ST) | Set of all term units in the search request |
| Search Term (ST) Layer | The functional level where processing occurs w/in an ST instance. |
| Search or Searchable Universe (SU) | For a given implementation, all the searchable information in its repository. |

GLOSSARY

| Term | Definition |
| --- | --- |
| Search Universe (SU) | The SU is the entire document repository, representing all the information available to a user or system, that is available. |
| Search Universe (SU) Layer | The functional level which processes data whose scope is the SU. |
| Section | A part of a document identified using a specific criteria, such as a set of TUs that belong to a topic. |
| Section Layer | The functional level which processes data that occurs w/in the section instance. |
| Switch | A switch refers to any system variable available to the user that has a multitude of values. A switch may be manifested in an output interface as a switch, dial, slider, wheel, motion sensor, touch sensor, drop down list, check box, radio button, or any such input mechanism that allows a variety of values to be selected. |
| Term Unit (TU) | In most languages, including English, any set of characters (e.g., words) or symbols separated by a space. |
| Term Unit Duplication (TUD) | The existence of two or more copies of a TU that occur outside of grammatical or syntactical constraints. |
| Term Unit Interval | The distance between two TUs, using the TU as the unit of measure. This is a binary operation. |
| Term Unit (TU) Layer | The functional level at which processing occurs w/in a TU constraint. |
| Tolerance | The range in which a specific function can operate in to affect the outcome of the search intersection. |
| Topical-Fetch (t-Fetch) | A Combinatorial-Discovery Type of Search that assigns topics to sections or entire ISet Members. |
| User | A user may be a person, an application, or a system. |
| Windex | Operates at TU scope. An efficient encoding scheme that stores a single term unit in a language, such as English, in a form that is distributable. |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A handheld device comprising:
a memory; and
a search engine that is stored on the memory;
wherein the search engine is operative to use a search request from a user of the handheld device to search an index;
wherein the index comprises a non-binary numeric code that includes grammar embedded rules, the device further comprising:
a RealTime Search component that receives the search request, converts the search request into a numeric code corresponding to the numeric code of said index, and compares the numeric code of the converted search request with the index to form search results; and
wherein the conversion of the search request is implemented by a transform function which utilizes mathematical relations and grammatically-controlled numeric pattern matches between search terms.

2. A handheld device comprising:
a memory; and
a search engine that is stored on the memory;
wherein the search engine is operative to use a search request from a user of the handheld device to search an index;
wherein the index comprises a non-binary numeric code that includes grammar embedded rules, the device further comprising:
a RealTime Search component that receives the search request, converts the search request into a numeric code corresponding to the numeric code of said index, and compares the numeric code of the converted search request with the index to form search results; and
wherein said numeric code that includes grammar rules creates said numeric grammar rules by converting standard grammar rules into mathematical equations prior to runtime.

3. The handheld device of claim 2 wherein said mathematical equations are represented in the converted search request and solved at runtime.

4. The handheld device of claim 1, wherein the index is stored on the memory of the handheld device.

5. The handheld device of claim 2, wherein the index is stored on the memory of the handheld device.

\* \* \* \* \*